(12) United States Patent
Henneberger et al.

(10) Patent No.: US 8,382,528 B2
(45) Date of Patent: Feb. 26, 2013

(54) JACK ASSEMBLY WITH VERTICALLY STAGGERED JACK BORES

(75) Inventors: Roy Lee Henneberger, Apple Valley, MN (US); James D. Dewey, Plymouth, MN (US); Ahmad R. Sajadi, Eagan, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/931,207

(22) Filed: Jan. 26, 2011

(65) Prior Publication Data

US 2011/0237135 A1 Sep. 29, 2011

Related U.S. Application Data

(63) Continuation of application No. 12/924,901, filed on Oct. 6, 2010, now Pat. No. 7,901,252, which is a continuation of application No. 12/655,470, filed on Dec. 29, 2009, now Pat. No. 7,815,472, which is a continuation of application No. 12/290,910, filed on (Continued)

(51) Int. Cl.
*H01R 24/04* (2006.01)
(52) U.S. Cl. .................................................. 439/668
(58) Field of Classification Search ................. 439/668, 439/578, 76.1, 63, 49, 669
See application file for complete search history.

(56) References Cited

U.S. PATENT DOCUMENTS

| | | | |
|---|---|---|---|
| 3,852,703 A | 12/1974 | Carney et al. | |
| 4,548,453 A | 10/1985 | Mummey et al. | |
| 4,749,968 A | 6/1988 | Burroughs | |
| 4,753,609 A | 6/1988 | Pfeffer et al. | |
| 4,768,961 A | 9/1988 | Lau | |
| 4,770,639 A | 9/1988 | Lau | |
| 4,784,609 A | 11/1988 | Lau | |
| 4,797,114 A | 1/1989 | Lau | |
| 4,820,200 A | 4/1989 | Lau | |
| 4,826,439 A | 5/1989 | Lau | |
| 4,840,568 A | 6/1989 | Burroughs et al. | |
| 4,861,281 A | 8/1989 | Warner | |
| 4,870,753 A | 10/1989 | Pfeffer et al. | |
| 4,969,258 A | 11/1990 | Fisher et al. | |
| 4,975,087 A | 12/1990 | Williams et al. | |
| 4,976,634 A | 12/1990 | Green et al. | |

(Continued)

FOREIGN PATENT DOCUMENTS

| | | |
|---|---|---|
| DE | 32 00 420 A1 | 7/1983 |
| WO | WO 96/38884 | 12/1996 |

(Continued)

OTHER PUBLICATIONS

Eighteen color photos of Telect, Inc. co-axial and twisted pair jack assemblies.

(Continued)

*Primary Examiner* — Chandrika Prasad
(74) *Attorney, Agent, or Firm* — Merchant & Gould P.C.

(57) ABSTRACT

The present disclosure relates to a jack assembly including a jack mount having a front side and a rear side. A jack of the assembly is adapted to be slidably mounted in a jack receiving region of the jack mount. The jack assembly also includes a plurality of cross-connect contacts, and a rear interface assembly. The rear interface assembly includes a dielectric cover piece and a plurality of rear connectors that project outward from the dielectric cover piece.

21 Claims, 20 Drawing Sheets

Related U.S. Application Data

Nov. 5, 2008, now Pat. No. 7,658,650, which is a continuation of application No. 11/803,938, filed on May 16, 2007, now Pat. No. 7,462,075, which is a continuation of application No. 11/474,731, filed on Jun. 26, 2006, now Pat. No. 7,234,974, which is a continuation of application No. 11/100,263, filed on Apr. 5, 2005, now Pat. No. 7,083,475, which is a continuation of application No. 10/925,686, filed on Aug. 24, 2004, now Pat. No. 6,881,099, which is a continuation of application No. 10/429,179, filed on May 2, 2003, now Pat. No. 6,799,998, which is a continuation of application No. 10/036,641, filed on Dec. 31, 2001, now Pat. No. 6,575,792, which is a continuation of application No. 09/470,508, filed on Dec. 22, 1999, now Pat. No. 6,352,451, which is a continuation of application No. 09/191,213, filed on Nov. 12, 1998, now Pat. No. 6,116,961.

(56) References Cited

U.S. PATENT DOCUMENTS

| | | |
|---|---|---|
| 5,092,029 A | 3/1992 | Fisher et al. |
| 5,145,416 A | 9/1992 | Cruise et al. |
| 5,170,327 A | 12/1992 | Burroughs |
| 5,199,878 A | 4/1993 | Dewey et al. |
| 5,393,249 A | 2/1995 | Morgenstern et al. |
| 5,413,494 A | 5/1995 | Dewey et al. |
| 5,417,588 A | 5/1995 | Olson et al. |
| 5,439,395 A * | 8/1995 | Laukzemis ............ 439/668 |
| 5,467,062 A | 11/1995 | Burroughs |
| 5,546,282 A | 8/1996 | Hill et al. |
| 5,634,822 A | 6/1997 | Gunell |
| 5,658,170 A | 8/1997 | Tan et al. |
| 5,685,741 A | 11/1997 | Dewey et al. |
| 5,738,546 A | 4/1998 | Burroughs et al. |
| 5,879,197 A * | 3/1999 | Dewey ............ 439/668 |
| 5,885,096 A | 3/1999 | Ogren |
| 5,938,478 A | 8/1999 | Werner |
| 6,116,961 A | 9/2000 | Henneberger et al. |
| 6,352,451 B1 | 3/2002 | Henneberger et al. |
| 6,358,093 B1 | 3/2002 | Phommachanh |
| 6,554,652 B1 | 4/2003 | Musolf et al. |
| 6,575,792 B2 | 6/2003 | Henneberger et al. |
| 6,619,993 B2 | 9/2003 | Jayne et al. |
| 6,626,705 B2 | 9/2003 | Perrone et al. |
| 6,632,106 B2 | 10/2003 | Musolf et al. |
| 6,799,998 B2 | 10/2004 | Henneberger et al. |
| 6,881,099 B2 | 4/2005 | Henneberger et al. |
| 6,918,793 B2 * | 7/2005 | Baker et al. ............ 439/668 |
| 6,994,593 B2 | 2/2006 | Baker et al. |
| 7,044,803 B2 | 5/2006 | Baker et al. |
| 7,083,475 B2 | 8/2006 | Henneberger et al. |
| 7,234,974 B2 | 6/2007 | Henneberger et al. |
| 7,462,075 B2 | 12/2008 | Henneberger et al. |
| 7,540,787 B2 | 6/2009 | Chouanard et al. |
| 7,658,650 B2 | 2/2010 | Henneberger et al. |
| 7,815,472 B2 | 10/2010 | Henneberger et al. |
| 2003/0013346 A1 | 1/2003 | Perrone et al. |
| 2003/0022559 A1 | 1/2003 | Musolf et al. |
| 2003/0064611 A1 | 4/2003 | Musolf et al. |
| 2004/0077220 A1 | 4/2004 | Musolf et al. |
| 2004/0077318 A1 | 4/2004 | Baker et al. |
| 2005/0202728 A1 | 9/2005 | Baker et al. |
| 2008/0254647 A1 | 10/2008 | Chouanard et al. |

FOREIGN PATENT DOCUMENTS

WO  WO 99/26427  5/1999

OTHER PUBLICATIONS

Two sheets of drawings entitled "Sales Assembly SC330 "HiSpec" Connector With Plastic Pegs" dated Jun. 20, 1997. The drawings show a card edge connector product sold by Molex Incorporated.

"Longframe (310) DSX 28 Termination Panel", p. 31, ADC Telecommunications catalog entitled DSX Digital Signal Cross-Connect Second Edition, 1987 along with drawings showing ADC longframe bifurcated jacks representative of the type used in the ADC longframe (310) DSX 28 termination panel.

Extended European Search Report for European Patent Application No. 05016170.2 mailed Jan. 19, 2009.

Extended European Search Report for European Patent Application No. 07012753.5 mailed Jan. 19, 2009.

Extended European Search Report for European Patent Application No. 07012754.3 mailed Jan. 21, 2009.

* cited by examiner

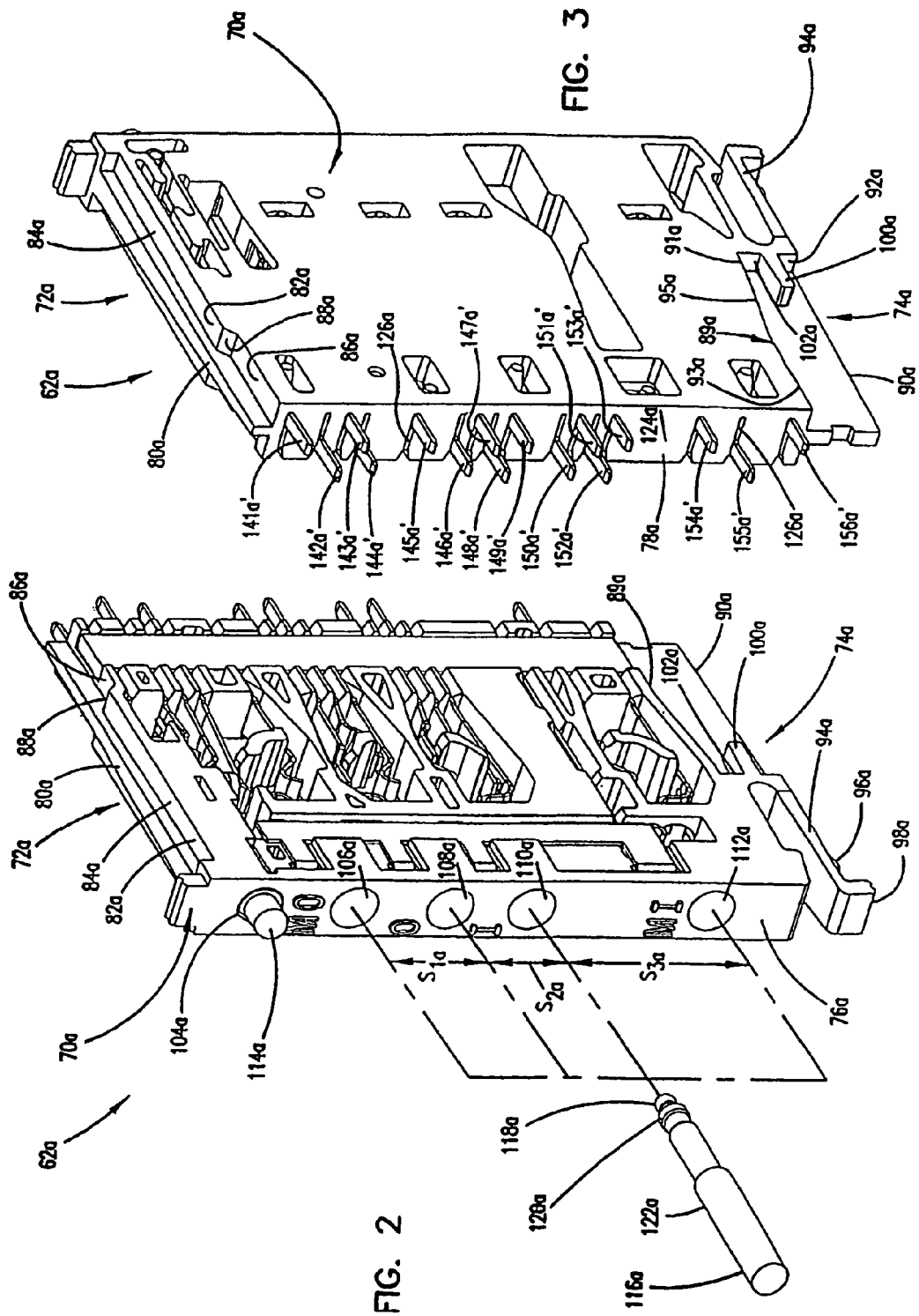

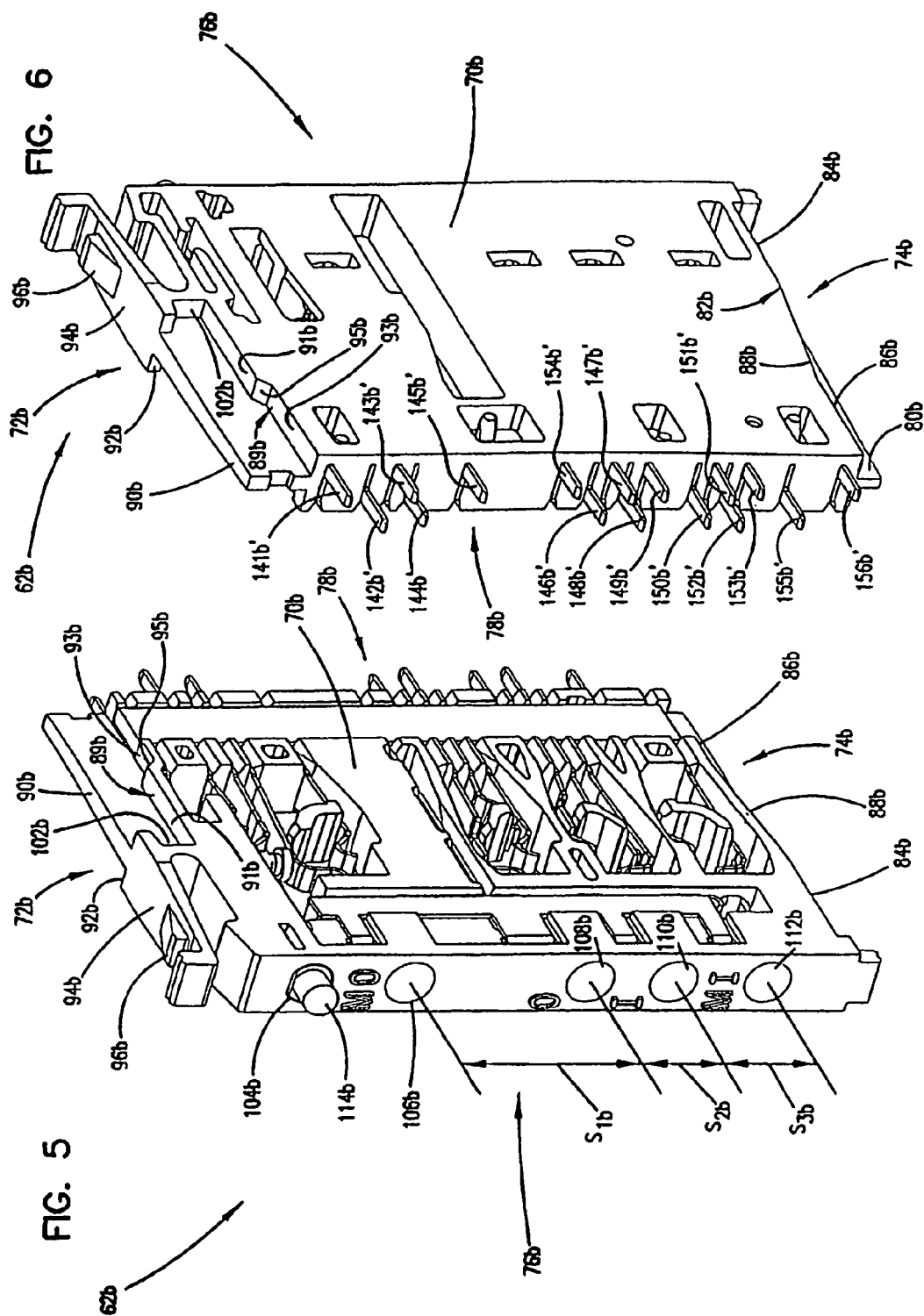

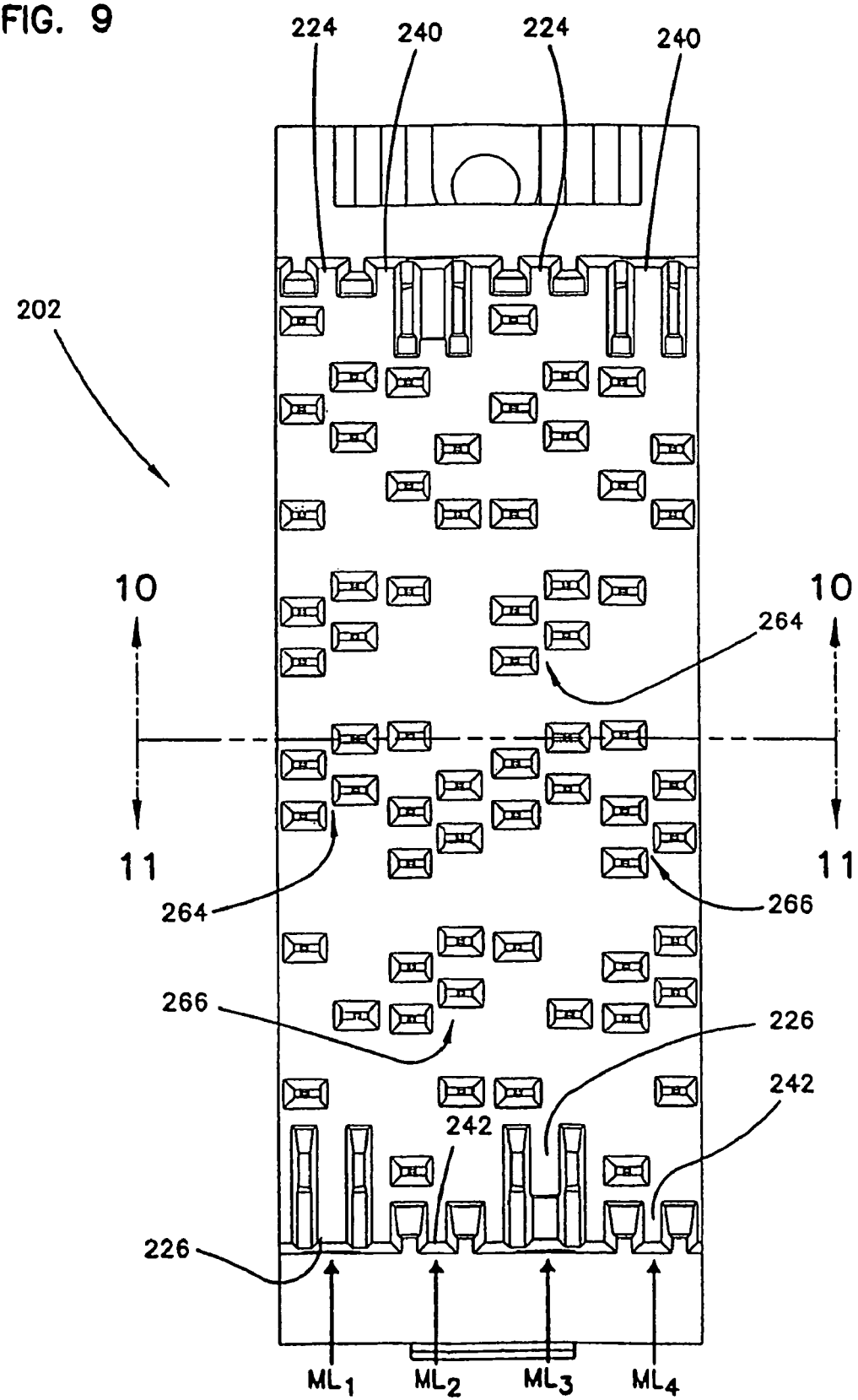

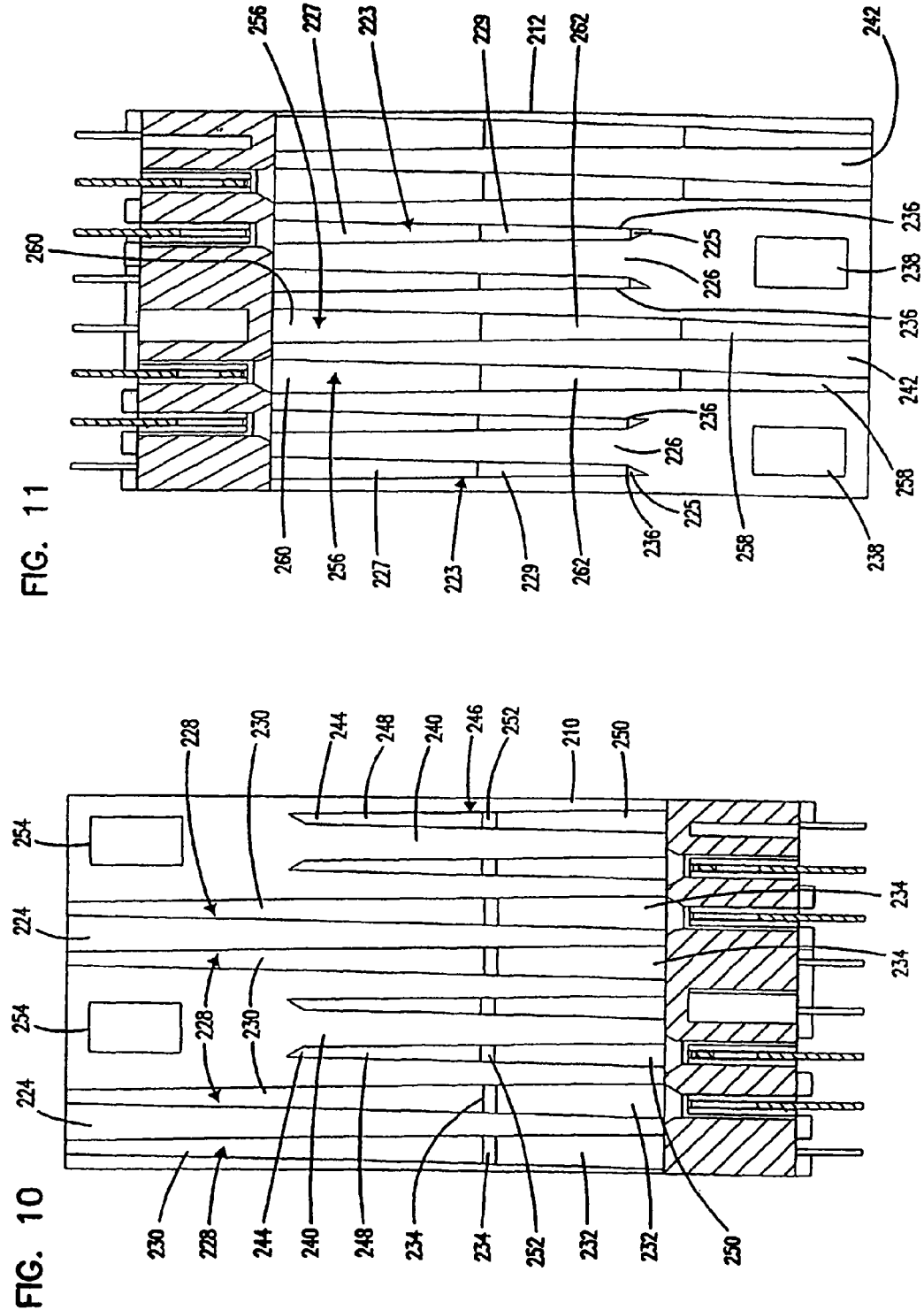

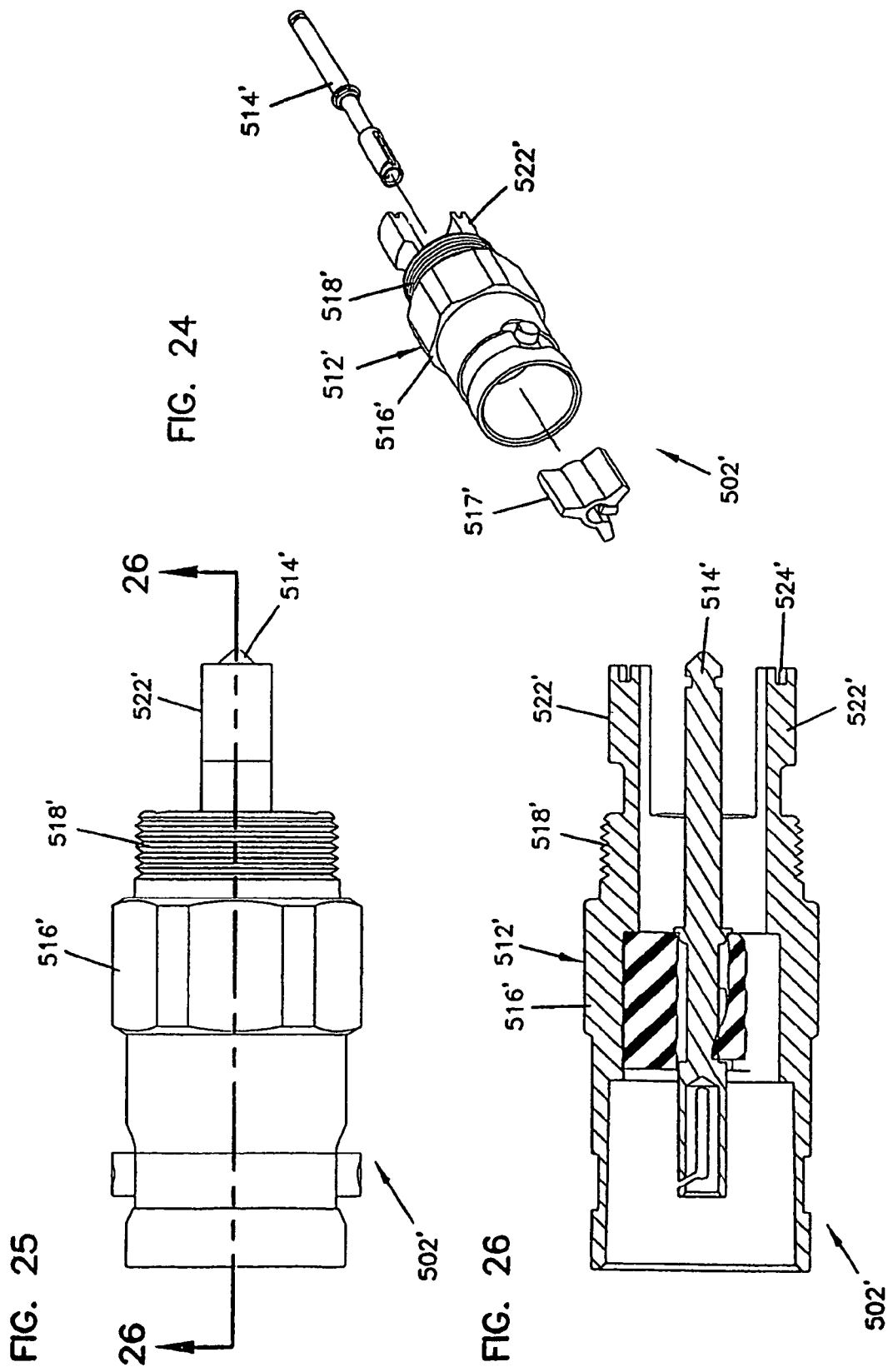

JACK ASSEMBLY WITH VERTICALLY STAGGERED JACK BORES

CROSS REFERENCE TO RELATED APPLICATIONS

This application is a continuation application of application Ser. No. 12/924,901, filed Oct. 6, 2010, now U.S. Pat. No. 7,901,252; which is a continuation application of application Ser. No. 12/655,470, filed Dec. 29, 2009, now U.S. Pat. No. 7,815,472; which is a continuation application of application Ser. No. 12/290,910, filed Nov. 5, 2008, now U.S. Pat. No. 7,658,650; which is a continuation of application Ser. No. 11/803,938, filed May 16, 2007, now U.S. Pat. No. 7,462,075; which is a continuation of application Ser. No. 11/474,731, filed Jun. 26, 2006, now U.S. Pat. No. 7,234,974; which is a continuation of application Ser. No. 11/100,263, filed Apr. 5, 2005, now U.S. Pat. No. 7,083,475; which is a continuation of application Ser. No. 10/925,686, filed Aug. 24, 2004, now U.S. Pat. No. 6,881,099; which is a continuation of application Ser. No. 10/429,179, filed May 2, 2003, now U.S. Pat. No. 6,799,998; which is a continuation of application Ser. No. 10/036,641, filed Dec. 31, 2001, now U.S. Pat. No. 6,575,792; which is a continuation of application Ser. No. 09/470,508, filed Dec. 22, 1999, now U.S. Pat. No. 6,352,451; which is a continuation of application Ser. No. 09/191,213, filed Nov. 12, 1998, now U.S. Pat. No. 6,116,961; which applications are incorporated herein by reference.

FIELD OF THE INVENTION

The present invention relates generally to cross-connect assemblies and, in particular, to jack assemblies for digital cross-connect systems.

BACKGROUND OF THE INVENTION

A digital cross-connect system (DSX) provides a location for interconnecting two digital transmission paths. The apparatus for a DSX is located in one or more frames, or bays, usually in a telephone central office. The DSX apparatus also provides jack access to the transmission paths.

DSX jacks are well known and typically include a plurality of bores sized for receiving tip-and-ring plugs. A plurality of spring contacts are provided within the bores for contacting the tip-and-ring plugs. The jacks are typically electrically connected to digital transmission lines, and are also electrically connected to a plurality of wire termination members used to cross-connect the jacks. By inserting plugs within the bores of the jacks, signals transmitted through the jacks can be interrupted or monitored.

SUMMARY OF THE INVENTION

One embodiment of the present invention relates to a jack assembly including a jack mount having a front side and a rear side. A jack of the assembly is adapted to be slidably mounted in a jack receiving region of the jack mount. The jack assembly also includes a plurality of cross-connect contacts, and a rear interface assembly. The rear interface assembly includes a dielectric cover piece and a plurality of rear connectors that project outward from the dielectric cover piece.

Another embodiment of the present invention relates to a telecommunications component including a jack mount having an open front side and a closed back side. The jack mount further includes a top wall and a bottom wall that define jack guides. Jacks are adapted for insertion into the open front side of the jack mount and guided within the jack guides. The telecommunications component also includes a plurality of cross-connect contacts and rear connectors, the cross-connect contacts and the rear connectors being connected to at least one circuit board.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of the description, illustrate several aspects of the invention and together with the description, serve to explain the principles of the invention. A brief description of the drawings is as follows:

FIG. 2 is a front perspective view of a jack in accordance with the principles of the present invention;

FIG. 3 is a rear perspective view of the jack of FIG. 2;

FIG. 5 is a front perspective view of an another jack in accordance with the principles of the present invention;

FIG. 6 is a rear perspective view of the jack of FIG. 5;

FIG. 9 is a front view of a portion of the jack mount of FIG. 8;

FIG. 10 is a cross-sectional view taken along section line 10-10 of FIG. 9;

FIG. 11 is a cross-sectional view taken along section line 11-11 of FIG. 9;

FIG. 24 is an exploded view of another connector constructed in accordance with the principles of the present invention;

FIG. 25 is an assembled side view of the connector of FIG. 24;

FIG. 26 is a cross-sectional view taken along section line 26-26 of FIG. 25;

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

I. Chassis Assembly

Figure 1:
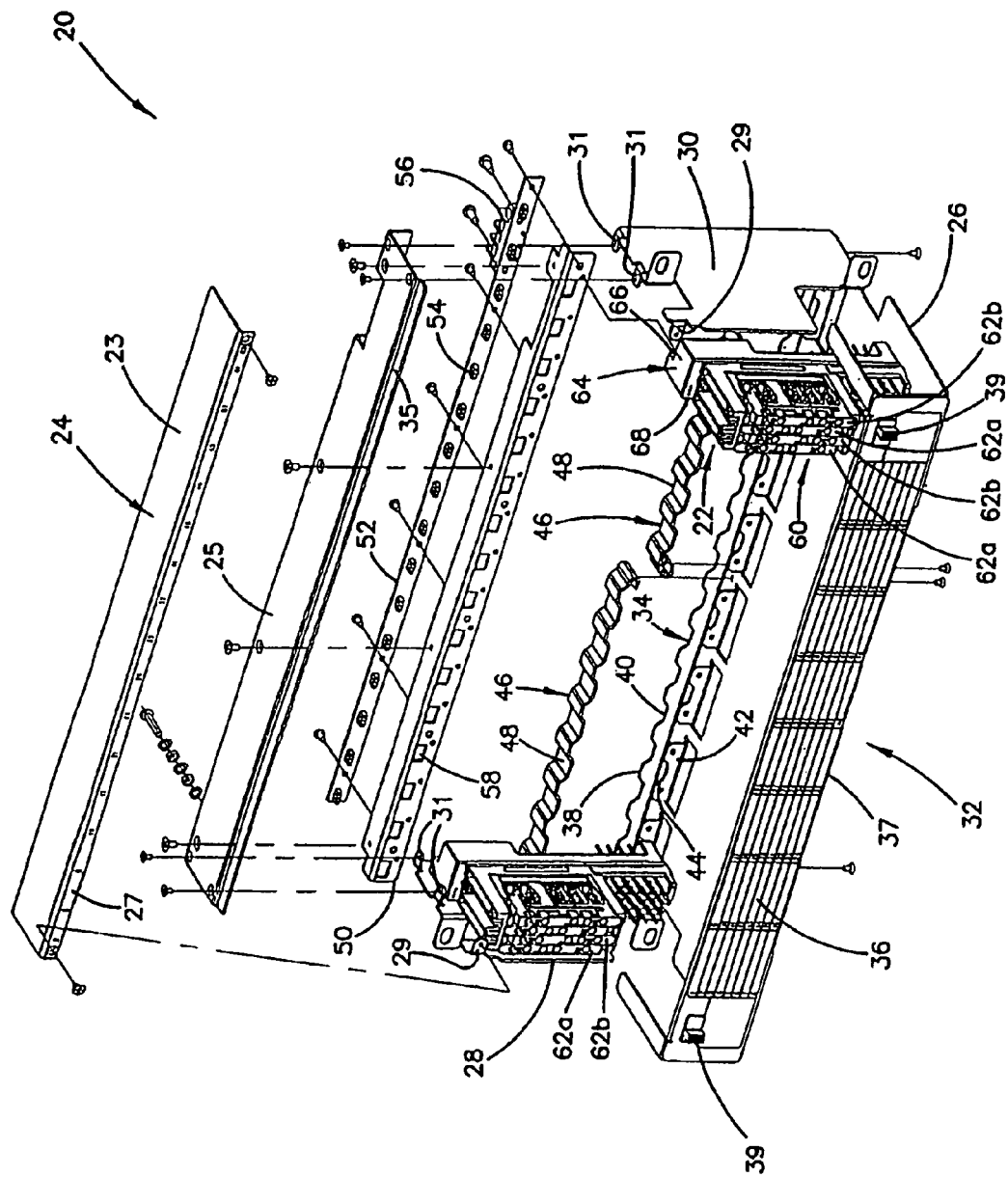
FIG. 1 is an exploded view of a chassis constructed in accordance with the principles of the present invention.

FIG. 1 is an exploded view of an embodiment of a chassis 20 for housing a plurality of jack mounts 22. For clarity, only two jack mounts 22 are shown in FIG. 1. However, it will be appreciated that the chassis 20 is adapted for housing a plurality of jack mounts 22. To conform with conventional international standards, the chassis 20 can house 16 jack mounts 22 and have a length of about 19 inches. Alternatively, in accordance with standard United States specifications, the chassis could be configured to house 21 jacks and have a length of about 23 inches. Of course, other sizes and numbers of jack mounts could also be used.

The chassis 20 includes a top piece 24 positioned opposite from a bottom piece 26. The top and bottom pieces 24 and 26 are interconnected by left and right side walls 28 and 30. The chassis 20 also includes a front side 32 positioned opposite from a back side 34. The top piece 24 includes separate front and back components 23 and 25. The front component 23 is connected to the chassis 20 by fasteners (e.g., screws) that extend through a front lip 27 of the front component 23 and engage front tabs 29 provided on the side walls 28 and 30. The rear component 25 is connected to the chassis 20 by fasteners (e.g., screws) that extend downward through top tabs 31 provided on the side walls 28 and 30. The rear component 25 defines a recessed lip 35 for receiving a rear portion of the front component 23 to form a joint therein between. The removable front component 23 assists in inserting or removing the jack mounts 22 into or from the chassis 20.

A wire tray door 36 is connected to the bottom piece 26 adjacent the front side 32 of the housing 20. A hinge 37 allows the door 36 to pivot between horizontal and vertical orientations. Latches 39 hold the door 36 in the vertical orientation. Additionally, a rear flange 38 projects upward from the bottom piece 26 adjacent the back side 34 of the chassis 20. The rear flange 38 defines a plurality of notches or cutaway portions 40. A plurality of mounting flanges 42 project upward from the bottom piece 26 between the front and back sides 32 and 34 of the chassis 20. The mounting flanges 42 are adapted for connecting the jack mounts 22 to the chassis 20. For example, the mounting flanges 42 are shown including holes for allowing the jack mounts 22 to be screwed or bolted to the mounting flanges 42. The mounting flanges 42 define cutaway portions 44 that correspond to alternating ones of the cutaway portions 40 defined by the rear flange 38.

Cover members 46 are positioned between the mounting flanges 42 and the rear flange 38. The cover members 46 define recesses 48 that align with the cutaway portions 40 and 44 respectively defined by the rear flange 38 and the mounting flanges 42. The cover members 46 function to conceal screws or other types of connecting members used to connect the jack mounts 22 to the mounting flanges 42. When coaxial rear interfaces (described later in the specification) are used in combination with the jack mounts 22, the cutaway portions 40 and 44 and the recesses 48 provide clearance for allowing the coaxial connectors to be accessed. In this manner, the height of the chassis 20 can be minimized while still providing access to the lowermost coaxial connectors.

The chassis 20 also includes a cover plate 50 connected below the top piece 24 of the chassis 20. A power strip 52 is connected to the front cover plate 50. The power strip 52 includes a plurality of electrical receptacles 54 electrically connected to a main power connector 56. The receptacles 54 align with and are set behind alignment openings 58 defined by the cover plate 50.

As shown in FIG. 1, the jack mount 22 is part of a jack assembly including odd jack inserts or jacks 62a, even jack inserts or jacks 62b, and a rear interface assembly 64. The rear interface assembly 64 includes a dielectric support 66, and a circuit board 68 positioned between the dielectric support 66 and the jack mount 22. The odd and even jacks 62a and 62b preferably have different configurations such that when the jacks 62a and 62b are mounted within the jack mount 22, plug bores defined by the jacks 62a and 62b are vertically staggered relative to one another.

II. Odd Jack Configuration

Figure 4:
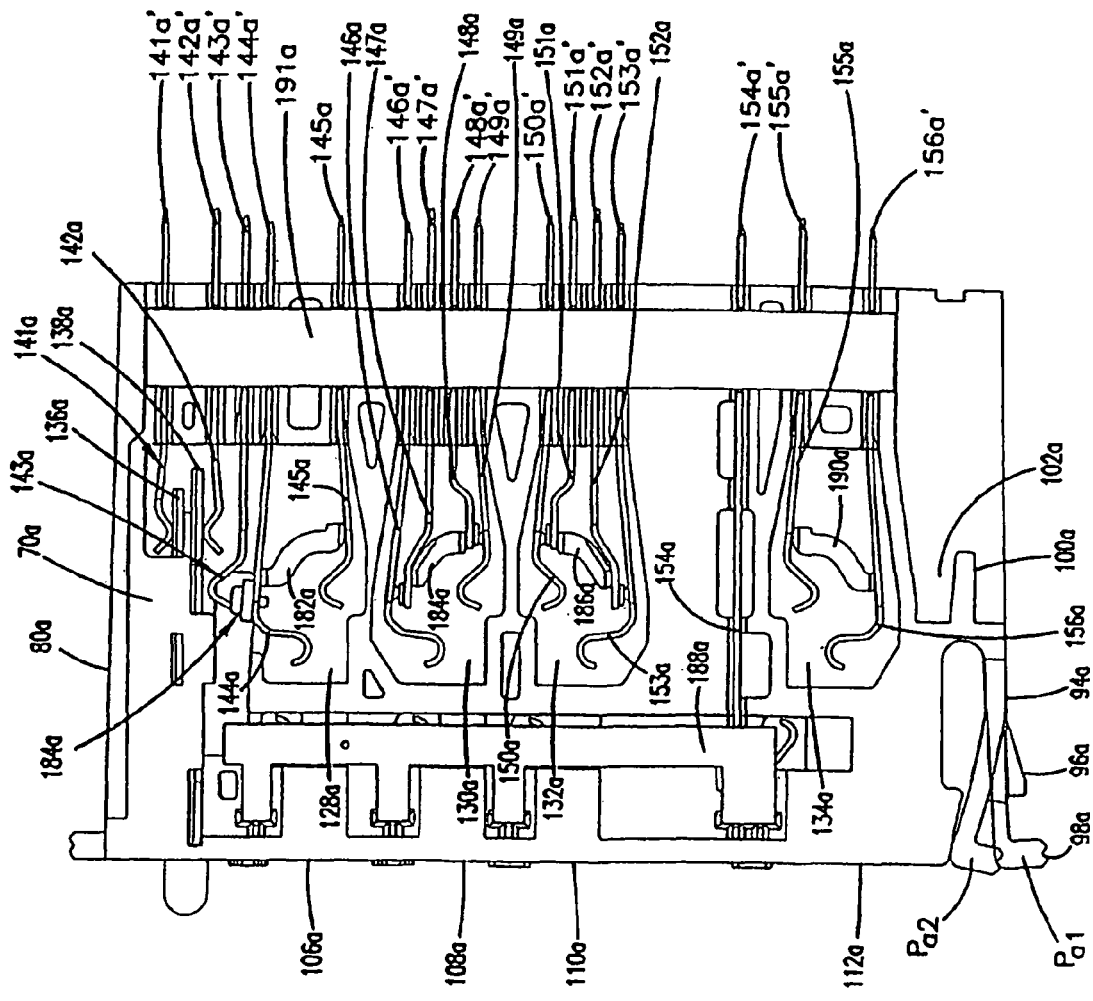
FIG. 4 is a side view of the jack of FIG. 2.

FIGS. 2-4 illustrate one of the odd jacks 62a in isolation from the jack mount 22. The jack 62a includes a dielectric jack body 70a. The dielectric jack body 70a includes a top side 72a and a bottom side 74a arranged and configured to slidingly interface with the jack mount 22. The jack body 70a also includes a front side 76a positioned opposite from a back side 78a. The top side 72a of the jack body 70a includes an elongated guide member 80a that extends between the front and back sides 76a and 78a of the jack body 70a. As best shown in FIG. 3, the guide member 80a tapers laterally outward as it extends from the back side 78a toward the front side 76a. Guide surfaces 82a are positioned on opposite sides of the guide member 80a. The guide surfaces 82a include substantially parallel front and rear portions 84a and 86a. The front and rear portions 84a and 86a are interconnected by ramped portions 88a such that the front portions 84a are elevated relative to the rear portions 86a.

The bottom side 74a of the jack body 70a includes a guide member 90a that extends between the back side 78a of the jack body 70a and a transverse wall 92a. The guide member 90a tapers laterally outward as it extends from the back side 78a toward the transverse wall 92a. The transverse wall 92a forms a base end of a cantilevered locking member 94a that extends from the transverse wall 92a toward the front side 76a of the jack body 70a. A locking tab 96a projects downward from the locking member 94a. A gripping member 98a projects downward from a free end of the locking member 94a. The locking member 94a preferably has a resilient or elastic structure such that the locking member 94a can be flexed upward by pressing upward on the gripping member 98a. By flexing the locking member 94a, the locking member 94a can be moved between a retaining position $P_{a1}$ (shown in FIG. 4) and a non-retaining position P.

The bottom side 74a additionally includes alignment members 100a that project laterally outward from opposite sides of the guide member 90a. The alignment members 100a are also connected to the transverse wall 92a and at least partially define alignment notches 102a positioned above the alignment members 100a. Guide surfaces 89a are positioned above notches 102a and include front and rear portions 91a and 93a interconnected by a ramped portion 95a. The rear portions 93a are elevated relative to the front portions 91a.

As best shown in FIG. 2, the front side 76a of the jack body 70a is generally planar and defines a light emitting diode (LED) port 104a, a monitor out port 106a, an out port 108a, an in port 110a, and a monitor in port 112a. As illustrated, the monitor out port 106a is spaced a first spacing $S_{1a}$ from the out port 108a. The out port 108a is spaced a second spacing $S_{2a}$ from the in port 110a. The in port 110a is spaced a third spacing $S_{3a}$ from the monitor in port 112a. In the preferred embodiment, the third spacing $S_{3a}$ is greater than the first spacing $S_{1a}$; more preferably, the third spacing $S_{3a}$ is greater than both the first spacing $S_{1a}$ and the second spacing $S_{2a}$; most preferably, the third spacing $S_{3a}$ is greater than the first spacing $S_{1a}$ and the first spacing $S_{1a}$ is greater than the second spacing $S_{2a}$. The LED port 104 is sized for receiving an LED 114a. Each of the other bores 106a, 108a, 110a and 112a is sized to receive a standard tip-and-ring plug 116a of known dimensions. The plug 116a includes a tip contact 118a, a ring contact 120a and a cylindrical sleeve 122a.

As shown in FIG. 3, the back side 78a of the jack body 70a is formed by a generally planar surface 124a that is generally parallel with respect to the front side 76a. The planar back surface 124a defines a plurality of back slots 126a each having a generally rectangular shape.

Referring now to FIG. 4, the jack body 70a also defines a monitor out chamber 128a, an out chamber 130a positioned below the monitor out chamber 128a, an in chamber 132a positioned below the out chamber 130a, and a monitor in chamber 134a positioned below the in chamber 132a.

The monitor out chamber 128a is in communication with both the LED port 104a and the monitor out port 106a. The LED 114a is mounted within the LED port 104a and includes first and second leads 136a and 138a that project into the monitor out chamber 128a. The first lead 136a is contacted by an electrically conductive voltage spring 141a, and the second lead 138a contacts an electrically conductive tracer lamp spring 142a. Electrically conductive tip-and-ring springs 145a and 144a are positioned within the monitor out chamber 128a in general alignment with the monitor out port 106a. The ring spring 144a and the tip spring 145a are separated by a dielectric spacer 182a that is integrally formed with the jack body 70a. A LED return spring 143a is positioned between the ring spring 144a and the tracer lamp spring 142a. When the tip-and-ring plug 116 is inserted within the monitor out port 106a, the ring spring 144a is flexed upwardly while the tip spring 145a is flexed downwardly. The ring spring 144a contacts the ring contact 120a, and the tip spring 145a contacts the tip contact 118a of the plug 116a. When the ring spring 144a is flexed upward, it causes the LED return spring 143a to contact the second lead 138a of the LED 114a thereby illuminating the LED 114a. A dielectric pad 184a attached to the ring spring 144a prevents the ring spring 144a from electrically contacting the LED return spring 143a.

The out chamber 130a is in communication with the out port 108a. Electrically conductive tip-and-ring springs 149a and 146a are positioned within the out chamber 130a in general alignment with the out port 108a. The tip-and-ring springs 149a and 146a are normally in electrical contact with the respective electrically conductive normal springs 148a and 147a. The normal springs 147a and 148a are separated by a dielectric spacer 184a that is integrally formed with the jack body 70a. When the plug 116a is inserted within the out port 108a, ring spring 146a is disconnected from normal spring 147a and electrically contacts the ring contact 120a of the plug 116a. Concurrently, tip spring 149a is disconnected from normal spring 148a and electrically contacts the tip contact 118a of the plug 116a.

The in chamber 132a is in communication with the in port 110a. Electrically conductive tip-and-ring springs 150a and 153a are positioned within the in chamber 132a in general alignment with the in port 110a. The tip-and-ring springs 150a and 153a are normally in electrical contact with respective electrically conductive normal springs 151a and 152a. Normal springs 151a and 152a are separated by a dielectric spacer 186a that is integrally formed with the jack body 70a. When the plug 116a is inserted within the in port 110a, the tip-and-ring springs 150a and 153a are respectively disengaged from the normal springs 151a and 152a, and respectively make electrical contact with the tip-and-ring contacts 118a and 120a of the plug 116a.

An electrically conductive sleeve ground spring 154a is positioned between the in chamber 132a and the monitor in chamber 134a. The ground spring 154a is electrically connected to a grounding strip 188a that has electrical contacts corresponding to each of the ports 106a, 108a, 110a and 112a. The contacts are configured to engage the sleeve 122a of the plug 116a when the plug is inserted within the ports 106a, 108a, 110a and 112a.

The monitor in chamber 134a of the jack body 70a is in communication with the monitor in port 112a. Electrically conductive tip-and-ring springs 155a and 156a are positioned within the monitor in chamber 134a in general alignment with the monitor in port 112a. A dielectric spacer 190a is positioned between the tip-and-ring springs 155a and 156a. When the plug 116a is inserted within the monitor in port 112a, the tip spring 155a makes electrical contact with the tip contact 118a and the ring spring 156a makes electrical contact with the ring contact 120a.

Referring to FIG. 4, the springs 141a-156a are preferably held within the jack body 70a by a dielectric strip 191a. The dielectric strip 191a is preferably press-fit or snapped within a corresponding slot defined by the jack body 70a.

As best shown in FIG. 3, electrically conductive springs 141a-156a each include portions 141a'-156a' that extend through the slots 126a defined by the back side 78a of the jack body 70a. The portions 141a'-156a' project outward from the back side 78a and form generally flat contact members adapted for electrically connecting the springs 141a-156a to a desired structure. As shown in FIG. 4, the portions 141a'-156a' have projection lengths that vary such that the tips of the portions 141a'-156a' are staggered. The staggered tips reduce the insertion force required to connect the jack 62a to a desired structure because all of the tips do not engage the desired structure simultaneously upon insertion.

III. Even Jack Configuration

Figure 7:
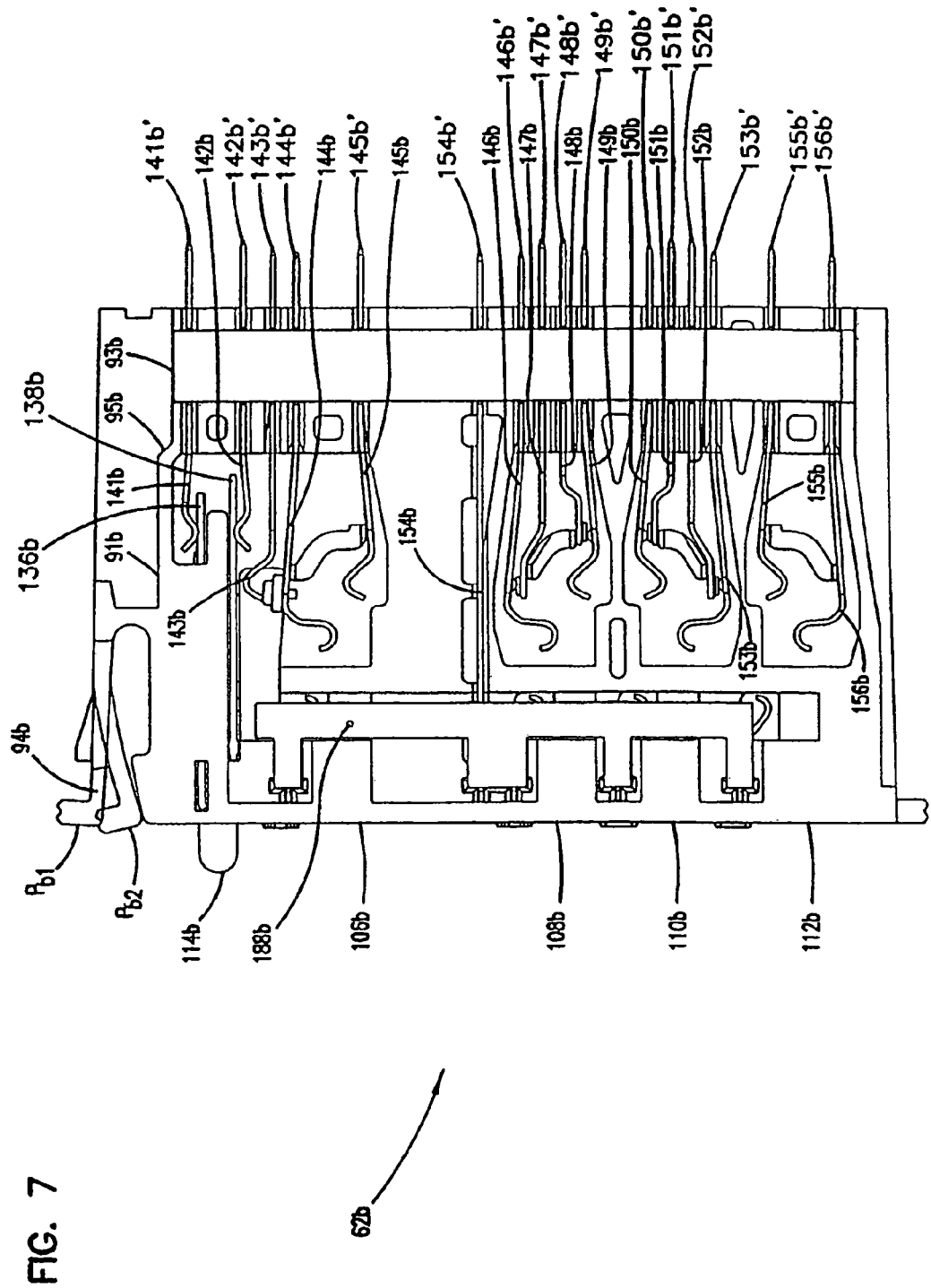
FIG. 7 is a side view of the jack of FIG. 5.

FIGS. 5-7 illustrate one of the even jacks 62b in isolation from the jack mount 22. The jack 62b includes a dielectric jack body 70b having a top side 72b positioned opposite from a bottom side 74b, and a front side 76b positioned opposite from a back side 78b. The top side 72b includes a laterally tapered guide member 90b, and a resilient locking member 94b having an upwardly projecting locking tab 96b. The locking member 94b can be flexed between a retaining position $P_{b1}$ and a non-retaining position $P_{b2}$. A transverse wall 92b is positioned generally between the locking member 94b and the guide member 90b. Alignment notches 102b are formed generally below the transverse wall 92b on opposite sides of the guide member 90b. Guide surfaces 89b are positioned below the notches 102b on opposite sides of the guide member 90b. The guide surfaces 89b include front portions 91b elevated relative to rear portions 93b, and ramped portions 95b positioned between the front and rear portions 91b and 93b.

The bottom side 74b of the jack body 70b includes an elongated guide member 80b extending between the front and back sides 76b and 78b. The guide member 80b tapers laterally outward as it extends from the back side 78b toward the front side 76b. The bottom side 74b also includes guide surfaces 82b positioned on opposite sides of the guide member 80b. The guide surfaces 82b include substantially parallel front and back portions 84b and 86b. A ramped portion 88b interconnects the front and back portions 84b and 86b such that the back portions 86b are elevated relative to the front portions 84b.

It will be appreciated that the top and bottom sides 72b and 74b of the jack body 70b have different configurations than the top and bottom sides 72a and 74a of the jack body 70a. Preferably, the top and bottom sides of the jack bodies 70a and 70b have varying configurations in order to provide a keying function. For example, by varying the configurations of the top and bottom sides of the jack bodies 70a and 70b, a user is prevented from placing the jacks 62a and 62b in the wrong positions on the jack mount 22. The user is also inhibited from inserting the jacks 62a and 62b upside-down into the jack mount 22.

As shown in FIG. 5, the front side 76b of the jack body 70b defines an LED port 104b, a monitor out port 106b, and out port 108b, an in port 110b, and a monitor in port 112b. It will be appreciated that the ports 104b, 106b, 108b, 110b and 112b are arranged in a different pattern than the ports 104a, 106a, 108a, 110a and 112a. For example, a larger spacing exists between the monitor out port 106b and the out port 108b as compared to the monitor out port 106a and the out port 108a. Additionally, a reduced spacing exists between the in port 110b and the monitor in port 112b as compared to the in port 110a and the monitor in port 112a. More specifically, the monitor out port 106b is spaced a first spacing $S_{1b}$ from the out port 108b. The out port 108b is spaced a second spacing $S_{2b}$ from the in port 110b. The in port 110b is spaced a third spacing $S_{3b}$ from the monitor in port 112b. In the preferred embodiment, the first spacing $S_{1b}$ is greater than the third spacing $S_{3b}$; more preferably, the first spacing $S_{1b}$ is greater than both the third spacing $S_{3b}$ and the second spacing $S_{2b}$; most preferably, the first spacing $S_{1b}$ is greater than the third spacing $S_{3b}$ and the third spacing $S_{3b}$ is greater than the second spacing $S_{2b}$. It will be appreciated that the terms "port" and "bore" are intended to be used interchangeably.

As shown best in FIG. 1, the out port 108a and the in port 110a (FIG. 2) of the odd jacks 62a are positioned or aligned with the first spacings $S_{1b}$ of the even jacks 62b (e.g., the ports 108a and 110a of the odd jacks 62a align between the ports 106b and 108b of the even jacks 62b). Likewise, the out port 108b and the in port 110b (FIG. 5) of the even jacks 62b are positioned or aligned with the third spacings $S_{3a}$ of the odd jacks 62a (e.g., the ports 108b, 110b of the even jacks 62b align between ports 110a and 112a of the odd jacks 62a).

The jack 62b has similar internal components to those previously described with respect to the jack 62a. For example, the jack 62b includes an LED 114b electrically connected to a voltage spring 141b and a tracer lamp spring 142b by leads 136b and 138b. An LED ground spring 143b is used to complete the circuit and light the LED 114b. The jack 62b also includes tip-and-ring springs 145b and 144b corresponding to the monitor out port 106b, tip-and-ring springs 149b and 146b corresponding to the out port 108b, tip and ring springs 150b and 153b corresponding to the in port 110b and tip-and-ring springs 155b and 156b corresponding to the monitor in port 112b. The ring-and-tip springs 146b and 149b normally contact respective normal springs 147b and 148b, and tip-and-ring springs 150b and 153b normally contact respective normal springs 151b and 152b. The jack 62b also includes a sleeve ground spring 154b interconnected to a grounding strip 188b having sleeve contacts corresponding to each of the ports 106b, 108b, 110b and 112b. The conductive springs 141b-156b each include end portions 141b'-156b' (best shown in FIG. 6) that project outward from the back side 78b of the jack body 70b so as to form electrical contact members. As shown in FIG. 7, the tips of the end portions 141a'-156a' are staggered.

IV. The Jack Mount

Figure 8:
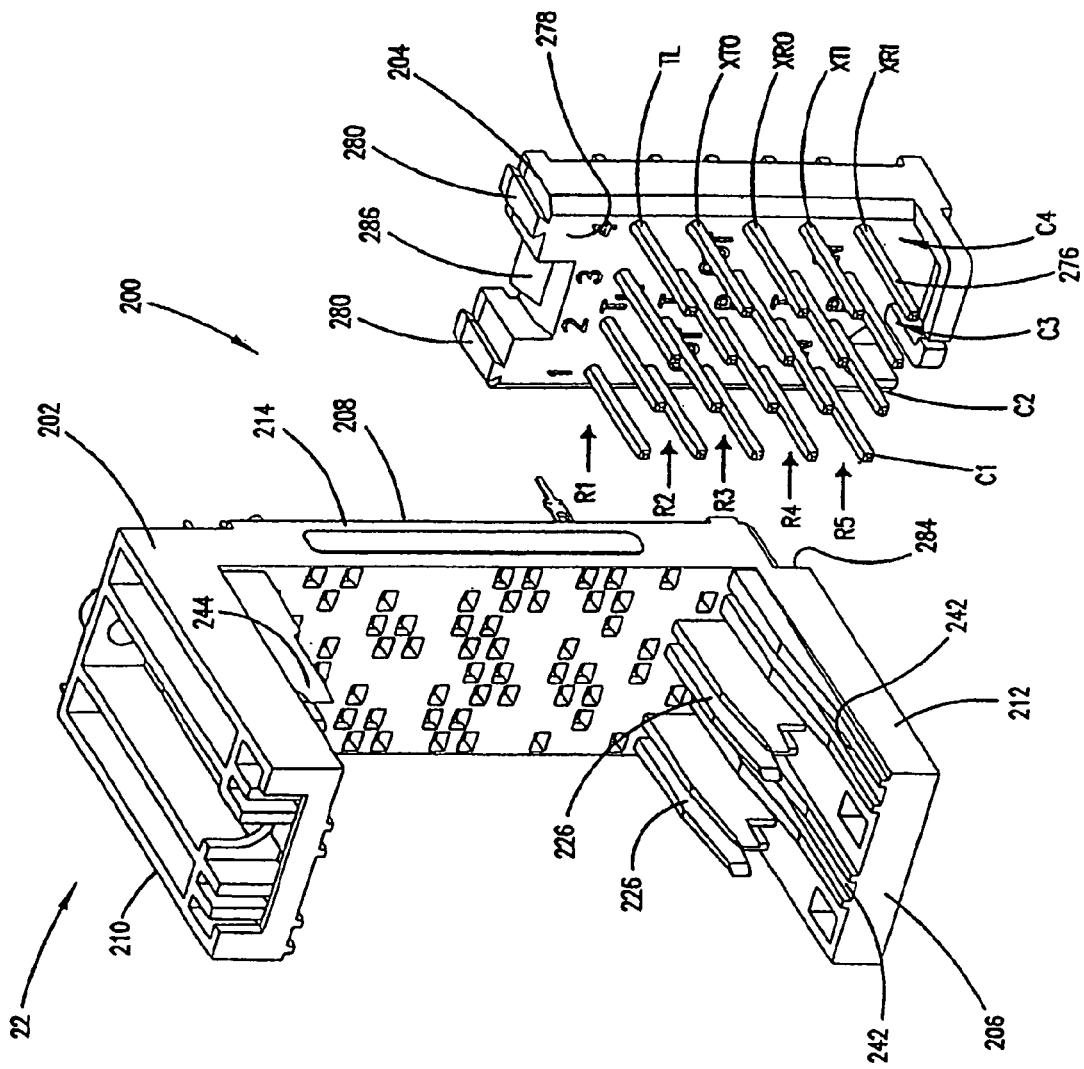
FIG. 8 is a front perspective view of jack mount in accordance with the principles of the present invention.

Referring now to FIG. 8, the jack mount 22 is shown in isolation from the chassis 20 with the jacks 62a and 62b removed. Generally, the jack mount 22 includes a mounting body 200 made of a dielectric material. The mounting body 200 includes a jack receiving piece 202 that can be detachably connected to a cross-connect piece 204. As will be described in greater detail below, the jack receiving piece 202 is adapted for housing or holding the jacks 62a and 62b, while the cross-connect piece 204 is adapted for providing cross-connects between jacks.

The jack receiving piece 202 of the mounting body 200 includes a front side 206 positioned opposite from a back side 208. The piece 202 also includes spaced-apart and substantially parallel top and bottom supports 210 and 212 that extend generally between the front and back sides 206 and 208. The top and bottom supports 210 and 212 are interconnected by a back wall 214 of the jack receiving piece 202. The top support 210, the bottom support 212 and the back wall 214 cooperate to define a jack mounting region or recess that opens outward toward the front side 206 of the upper piece 202.

As shown in FIG. 9, the jack receiving piece 202 of the mounting body 200 defines four separate jack mounting locations $ML_1$, $ML_2$, $ML_3$ and $ML_4$. Jack mounting locations $ML_1$ and $ML_3$ are adapted to receive the odd jacks 62a, while mounting locations $ML_2$ and $ML_4$ are adapted for receiving the even jacks 62b.

Mounting locations $ML_1$ and $ML_3$ each include top and bottom channels 224 and 226 respectively formed on the top support 210 and the bottom support 212. The top and bottom channels 224 and 226 are configured to respectively complement the top and bottom sides 72a and 74a of the jacks 62a. For example, referring to FIG. 10, the top channels 224 are tapered so as to compliment or match the taper of the guide members 80a formed on the top sides 72a of the jack bodies 70a. Additionally, the walls forming the top channels 224 have downwardly facing guide surfaces 228 including front portions 230, rear portions 232 and ramped portions 234 that respectively correspond to and complement the front portions 84a, rear portions 86a and ramped portions 88a of the guide surfaces 82a positioned along the top side 72a of the jack body 70a.

As shown in FIG. 11, the bottom channels 226 are tapered so as to complement or correspond to the taper of the guide member 90a positioned at the bottom side 74a of the jack body 70a. The bottom channels 226 also include end projections 236 adapted to mate with or fit within the alignment notches 102a formed adjacent the bottom side 74a of the jack body 70a. The walls forming the channels 226 have upwardly facing guide surfaces 223 including front, rear and ramped portions 225, 227 and 229 that respectively complement the front, rear, and ramped portions 91a, 93a and 95a of the guide surfaces 89a formed on the bottom side of each jack 62a.

The jack 62a is mounted within one of the mounting locations ML$_1$ and ML$_3$ by inserting the rear ends of the guide members 80a and 90a respectively within the top and bottom channels 224 and 226. The jack 62a is then pushed inward toward the back wall 214 of the jack receiving piece 202 causing the guide members 80a and 90a to respectively slide along the top and bottom channels 224 and 226. When the jack 62a has been fully inserted into the jack receiving piece 202, the locking tab 96a of the resilient locking member 94a snaps within a hole 238 (shown in FIG. 11) defined by the bottom support 212. To remove the jack 62a from the jack mount 22, the resilient locking member 94a is flexed from the retaining position P$_{a1}$ to the non-retaining position P$_{a2}$ such that the locking tab 96a is displaced from the hole 238. The jack 62a can then be manually pulled out from the jack receiving piece 202.

Jack mounting locations ML$_2$ and ML$_4$ each define top and bottom channels 240 and 242 respectively formed on the top support 210 and the bottom support 212. The top channels 240 are configured to complement the shape of the top side 72b of the jack 62b. For example, the top channels 240 are tapered so as to complement the taper of the guide member 90b formed on the top side 72b of the jack 62b. As shown in FIG. 10, the top channels 240 also include projections 244 adapted to fit within the alignment notches 102b formed on the jack body 70b adjacent the top side 72b. Furthermore, the walls defining the top channel 240 include downwardly facing guide surfaces 246 including front portions 248, rear portions 250 and ramped portions 252 that respectively complement the front, rear and ramped portions 91b, 93b and 95b of the guide surfaces 89b formed on the top side 72b of the jack body 70b. It is further noted that the top support 210 defines openings 254 arranged and configured to receive the locking tab 96b of the jack body 70b when the jack 62b is mounted within the jack mount 22.

The bottom channels 242 are each configured to compliment the bottom side 74b of the jack body 70b. For example, as shown in FIG. 11, the bottom channels 242 are tapered to correspond with the taper of the guide member 80b formed on the bottom side 74b of the jack body 70b. Additionally, the walls defining the bottom channels 242 include guide surfaces 256 having front, rear and ramped portions 258, 260 and 262 arranged and configured to respectively complement the front, rear and ramped portions 84b, 86b and 88b of the guide surfaces 82b formed on the bottom side 74b of the jack body 70b.

The top and bottom channels 224, 226 of mounting locations ML$_1$ and ML$_3$, and the top and bottom channels 240, 242 of mounting locations ML$_2$ and ML$_4$ have been designed in coordination with the top and bottom sides of the jacks 62a and 62b in order to provide a keying function. For example, the jack 62a can only be mounted in the jack mount 22 if it is oriented in an upright position and is inserted into either one of the jack mounting locations ML$_1$ and ML$_3$. Interference between the top and bottom sides of the jack 62a and the top and bottom channels 240 and 242 prevents the jack 62a from being inserted into either one of mounting locations ML$_2$ and ML$_4$. Similarly, the even jack 62b can only be mounted at mounting locations ML$_2$ and ML$_4$. If the user attempts to insert the jack 62b into either of the jack mounting locations ML$_1$ and ML$_3$, the jack 62b will bind with the top and bottom channels 224 and 226 thereby preventing the jack 62b from being fully inserted into the jack mount 22.

As shown in FIG. 9, mounting locations ML$_1$ and ML$_3$ each include a corresponding pattern or array of openings 264 defined through the back wall 214 of the jack receiving piece 202 of the mounting body 200. The openings 264 are configured to receive the spring ends 141a'-156a' that project outward from the back side 78a of each jack 62a. Similarly, each of mounting locations ML$_2$ and ML$_4$ includes a corresponding pattern or array of openings 266 formed through the back wall 214 of the jack receiving piece 202 of the mounting body 200. The openings 266 are configured to receive the spring ends 141b'-156b' that project outward from the back side 78b of each jack 62b.

Figure 12:
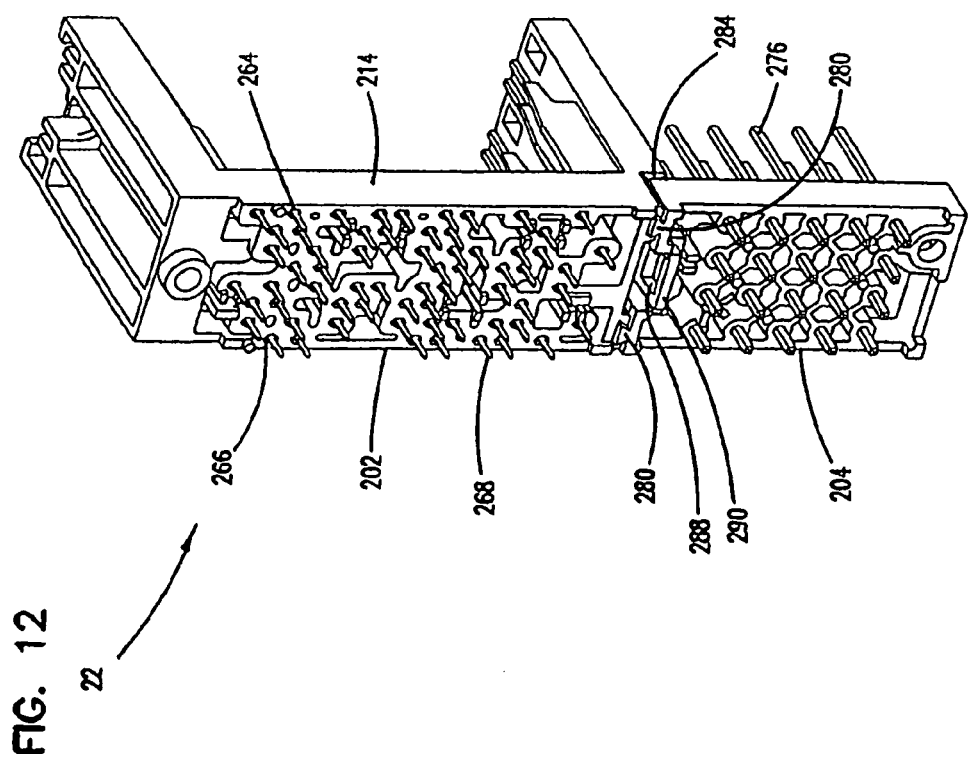
FIG. 12 is a rear perspective view of the jack mount of FIG. 8.
Figure 14:
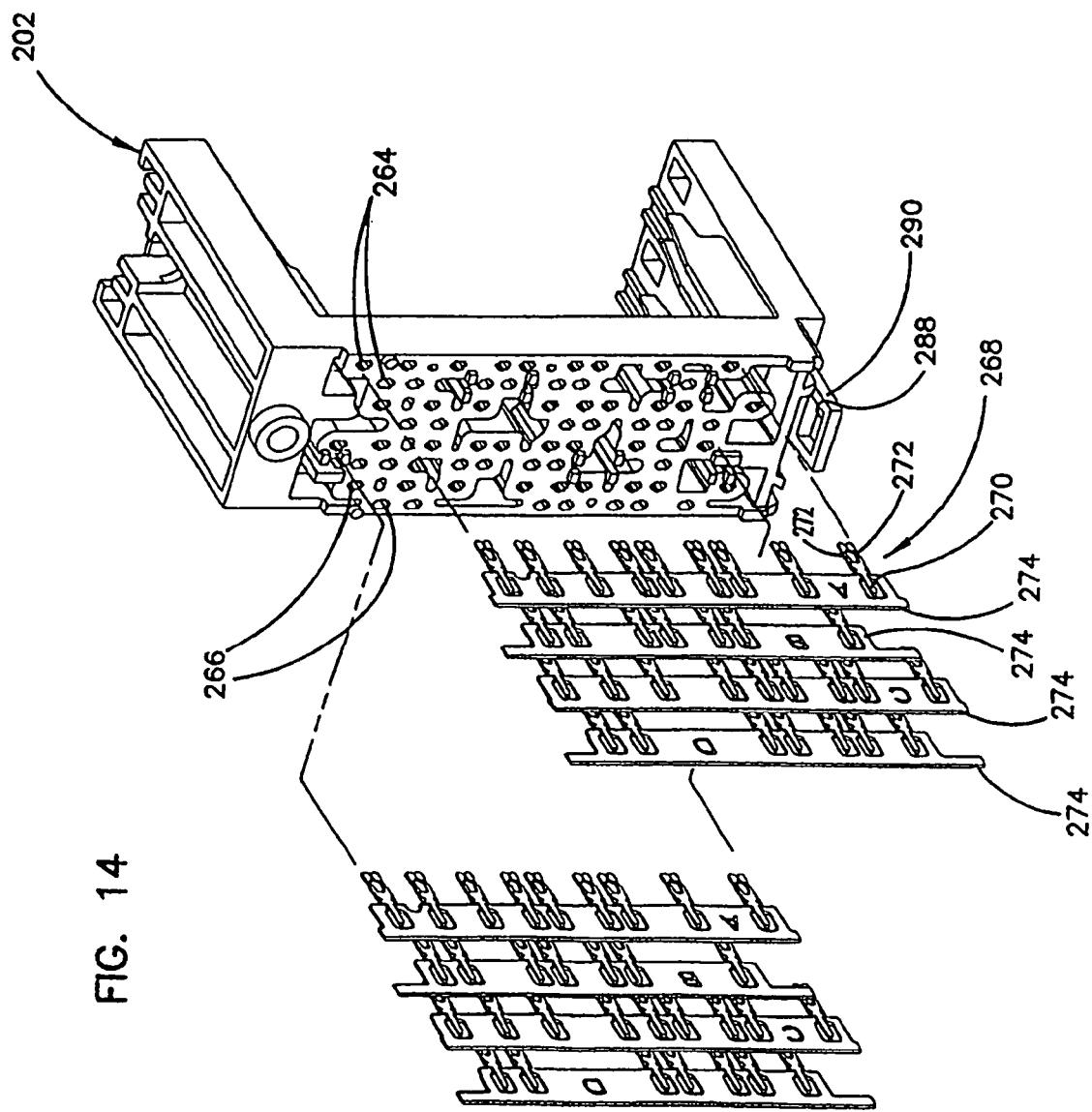
FIG. 14 is an assembly view of the jack mount of FIG. 8.

Referring to FIG. 12, the openings 264 and 266 extend completely through the back wall 214. Connection pins 268 are mounted within each of the openings 264 and 266. As shown in FIG. 14, each of the connection pins 268 includes a pin portion 270 that projects outward from the back side 208 of the jack receiving piece 202, and two opposing, cantilevered contact members 272 that are press fit within the openings 264 and 266. In the assembly view of FIG. 14, the connection pins 268 are shown connected to elongated installation tools 274 (e.g., the connection pins 268 and the installation tools 274 have been stamped from a common strip of conductive material). The installation tools 274 maintain a vertical spacing between the connection pins 268 that corresponds to the vertical spacing of the openings 264 and 266. For example, the installation tools 274 labeled A and B align the connection pins 268 in a pattern that corresponds to the pattern defined by the openings 264. The installation tools 274 labeled C and D align the connection pins 268 in a pattern that corresponds to the pattern defined by the openings 266. The installation tools 274 are used to press multiple pins 268 in the openings 264 and 266 at once. After the pins have been pressed within the openings 264 and 266, the tools 274 are laterally twisted causing the pins to break-off within the openings 264 and 266.

When the jacks 62a are mounted within the jack mount 22, the spring extensions 141a'-156a' fit within the openings 264 and are compressed between the opposing contact members 272 of the connection pins 268 such that the spring contacts 141a-156a are electrically connected to the pins 268. Similarly, when the jacks 62b are mounted within the jack mount 22, the spring extensions 141b'-156b' fit within the openings 266 and are compressed between the opposing contact members 272 of the connection pins 268 to provide an electrical interface between the jack springs 141b-156b and the connection pins 268. The variable lengths of the spring extensions 141a'-156a' and 141b'-156b' assist in reducing the insertion force required to press the spring extensions between the contact members 272.

Referring back to FIG. 8, the cross-connect piece 204 of the mounting body 200 is adapted for providing cross-connections between jacks. For example, four columns (C$_1$-C$_4$) and five rows (R$_1$-R$_5$) of wire termination members 276 (e.g., wire wrap members or posts) are shown projecting outward from a front face 278 of the piece 204. It will be appreciated that the removability of the cross-connect piece 204 from the jack receiving piece 202 is significant because different types of wire termination members or contacts can be used to provide cross-connections. For example, for certain applications, it may be desired to use insulation displacement connectors (IDC) for providing cross-connections between jacks. By using cross-connect pieces 204 that are separate from the jack mounting portion 202, cross-connect pieces having different types of connectors can be used with the common base to enhance manufacturing efficiency. While wire wrap members and insulation displacement connectors have been specifically described, it will be appreciated that other types of connectors could also be used.

Figure 13:
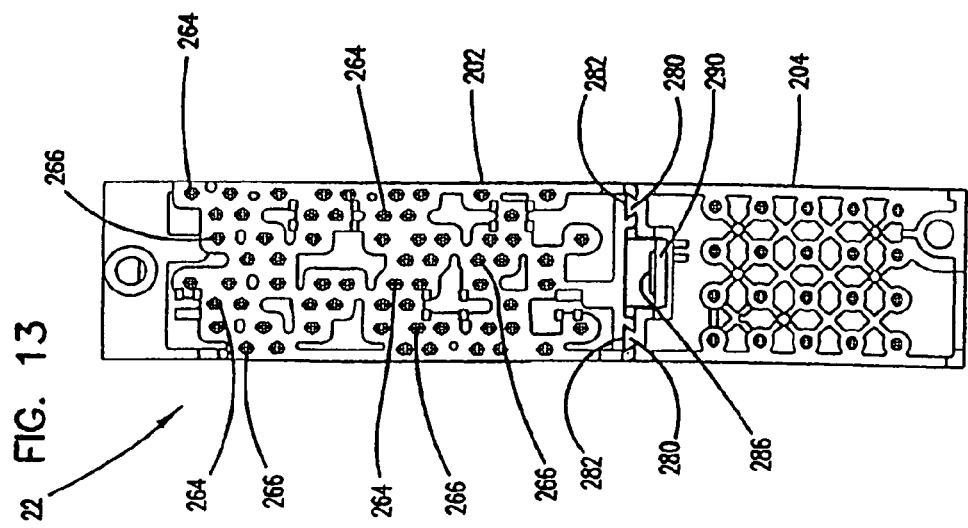
FIG. 13 is a rear view of the jack mount of FIG. 8.

To provide a detachable interface between the jack receiving piece 202 and the cross-connect piece 204, the cross-connect piece 204 includes two spaced-apart tongues 280 (shown in FIG. 8) that are slidingly received within corresponding spaced-apart grooves 282 (shown in FIG. 13) defined by the jack receiving piece 202. To connect the cross-connect piece 204 to the jack-receiving piece 202, the tongues 280 are aligned with the grooves 282 and the cross-connect piece 204 is slid from the back side 208 of the jack receiving piece 202 toward the front side 206. The tongues 280 are slid along the grooves 282 until the front face 278 of the cross-connect piece 204 engages a shoulder 284 defined by the piece 202. When the cross-connect piece 204 engages the shoulder 284, an upwardly projecting tab 286 (shown in FIG. 8) formed on the cross-connect piece 204 snaps within a locking opening 288 (shown in FIG. 14) defined by a resilient clip 290 formed at the bottom of the jack receiving piece 202. To remove the cross-connect piece 204 from the jack-receiving piece 202, the clip 290 is flexed upwardly such that the tab 286 disengages from the opening 288, and the lower piece 204 is pulled in a rearward direction from the upper body 202.

V. Twisted Pair Rear Interface

Figure 15:
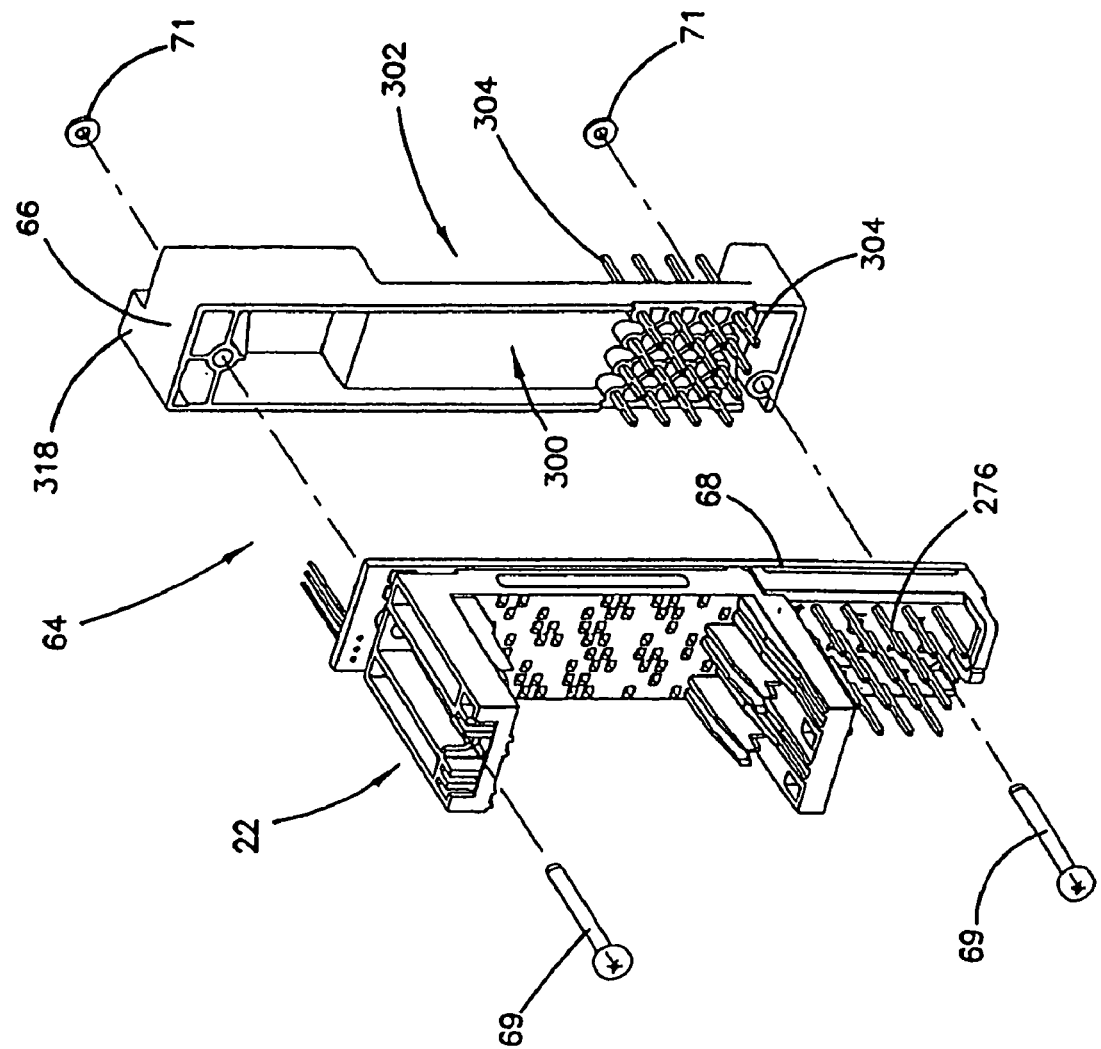
FIG. 15 is a front exploded view of a jack mount and twisted pair rear interface assembly in accordance with the principles of the present invention.
Figure 16:
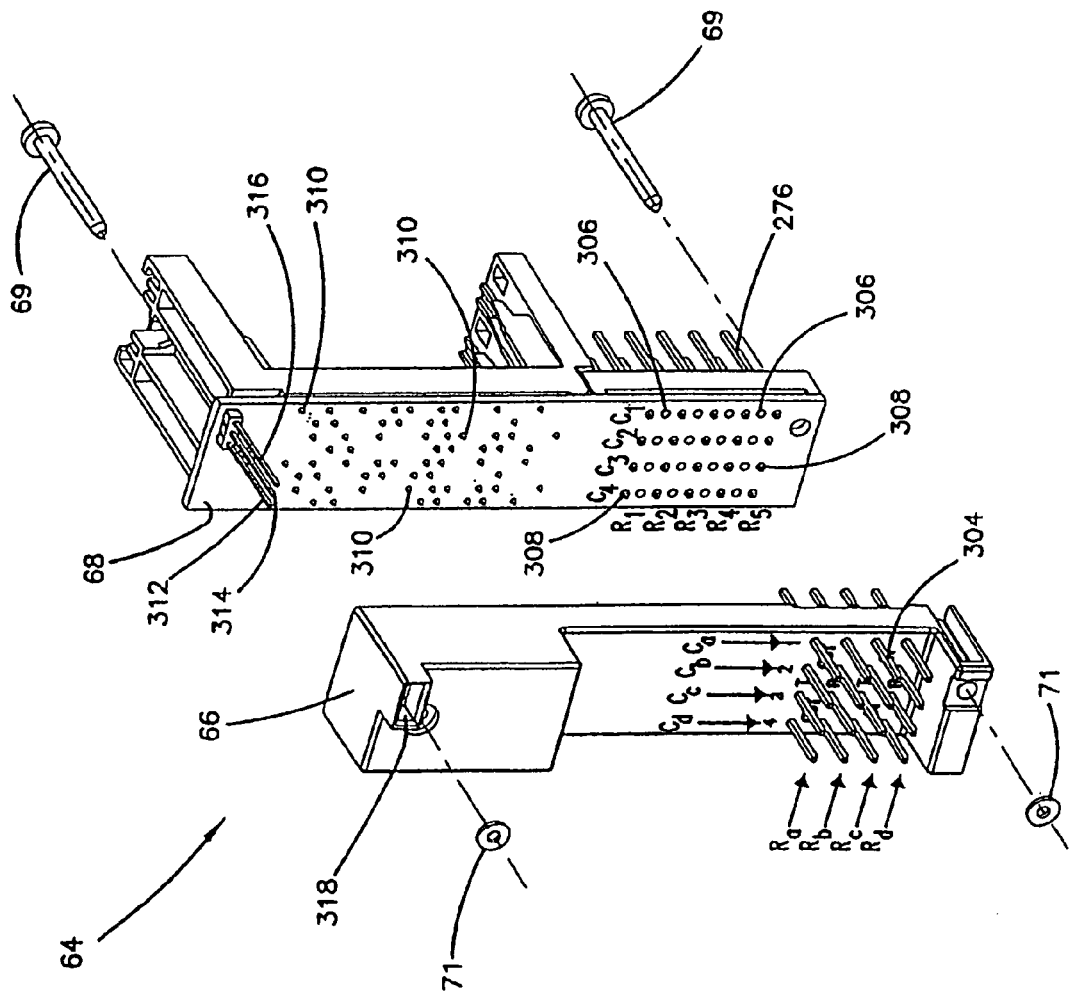
FIG. 16 is a rear exploded view of the jack mount and twisted pair rear interface assembly of FIG. 15.

FIG. 15 illustrates the dielectric support 66 of the rear interface assembly 64 removed from the circuit board 68. The dielectric support 66 includes a front side 300 adapted to face the circuit board 68, and a back side 302 adapted to face away from the circuit board 68. As shown in FIG. 16, the rear interface assembly 64 also includes four columns ($C_a$-$C_d$) and four rows ($R_a$-$R_d$) of wire termination members 304 press fit within holes defined by the dielectric support 66. The wire termination members 304 are shown as wire wrap members. However, it will be appreciated that other types of wire termination members such as insulation displacement connectors could also be used.

Referring to FIG. 16, the wire termination members 304 are adapted to contact plated through-holes 306 in the circuit board 68. Similarly, the wire termination members 276 of the jack mount 22 connect with plated through-holes 308 in the circuit board 68. The plated through-holes 306 are oriented in rows that are positioned between rows $R_1$-$R_5$. The circuit board 68 also includes a plurality of additional plated through-holes 310 positioned to make electrical contacts with the connector pins 268 that project outward from the back wall 214 of the jack mount upper piece 202 (shown in FIG. 12).

The dielectric support 66 of the rear interface assembly 64 defines a protective receptacle 318 in which a voltage lead 312, a return lead 314 and a sleeve ground lead 316 are mounted. The receptacle 318 is adapted to interconnect with the receptacles 54 formed on the power strip 52 of the chassis 20. When the jacks 62a and 62b are mounted within the jack mount 22, the voltage springs 141a, 141b of the jacks are placed in electrical connection with the voltage leads 312, the return spring 143a, 143b of the jacks 62a, 62b are placed in electrical connection with the return leads 314, and the ground springs 154a, 154b of the jacks 62a, 62b are placed in electrical connection with the shield ground leads 316.

Figure 17:
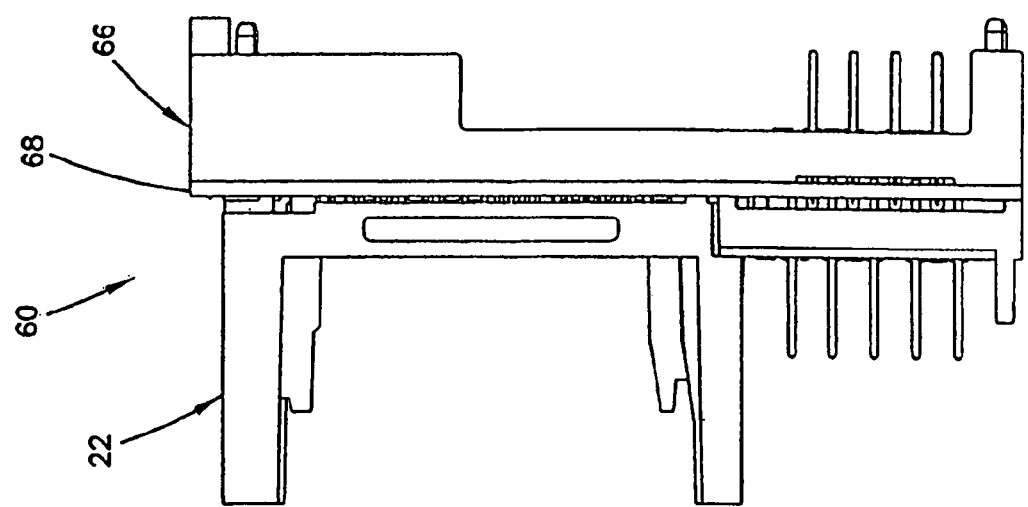
FIG. 17 is a side assembled view of the jack mount and twisted pair rear interface assembly of FIG. 15.

Referring to FIG. 17, when the jack assembly 60 is assembled, the printed circuit board 68 is positioned between the jack mount 22 and the dielectric support 66 (the jacks of the assembly are not shown in FIG. 17). The circuit board 68 includes a plurality of circuit paths for electrically connecting selected ones of the connection pins 268 to the receptacle leads 312, 314 and 316, to the wire termination members 304 of the rear interface assembly 64, and to the cross-connect wire termination members 276. The single circuit board 68 is adapted for connecting all four jacks 62a and 62b (shown in FIG. 1) to the leads 312, 314 and 316, and to the their corresponding columns of rear interface wire termination members 304 and cross-connect wire termination members 276. When the jacks 62a and 62b are removed from the jack mount 22, the jacks 62a and 62b are disconnected from the circuit board 68.

As shown in FIGS. 15 and 16, the circuit board 68, the jack mount 22 and the dielectric support 66 define coaxially aligned openings sized to receive fasteners 69 (e.g., bolts or screws) for connecting the pieces together. The fasteners 69 extend through captivation washers 71 that are press-fit over the fasteners 69. The captivation washers 71 and the fasteners 69 hold the jack mount 22, the circuit board 68 and the dielectric support 66 together after assembly and inhibit the pieces from being unintentionally pulled apart prior to connection to the chassis 20. The assembly 60 is connected to the chassis 20 by threading the fasteners within holes defined by the chassis 20 (e.g., holes defined by the flanges 42 and the coverplate 50 of the chassis 20).

In use of the jack assembly 60, columns $C_1$-$C_4$ of cross-connect wire termination member 276 are respectively connected to jacks positioned in mounting locations $ML_1$-$ML_4$. The wire termination members 276 of row $R_1$ are tracer lamp contacts (TL), the wire termination members 276 of row $R_2$ are cross-connect tip-out contacts (XTO), the wire termination members 276 of row $R_3$ are cross-connect ring-out contacts (XRO), the wire termination members 276 of row $R_4$ are cross-connect tip-in contacts (XTI), and the wire termination members 276 of row $R_5$ are cross-connect ring-in contacts (XRI).

Columns $C_a$-$C_d$ of the IN/OUT termination members 304 are respectively in electrical contact with jacks inserted within jack mounting locations $ML_1$-$ML_4$. The wire termination members 304 of row $R_a$ are tip-out contacts (TO), the wire termination members 304 forming row $R_b$ are ring-out contacts (RO), the wire termination members 304 forming row $R_c$ are tip-in contacts (TI), and the wire termination members 304 forming row $R_d$ are ring-in contacts (RI).

Figure 18:
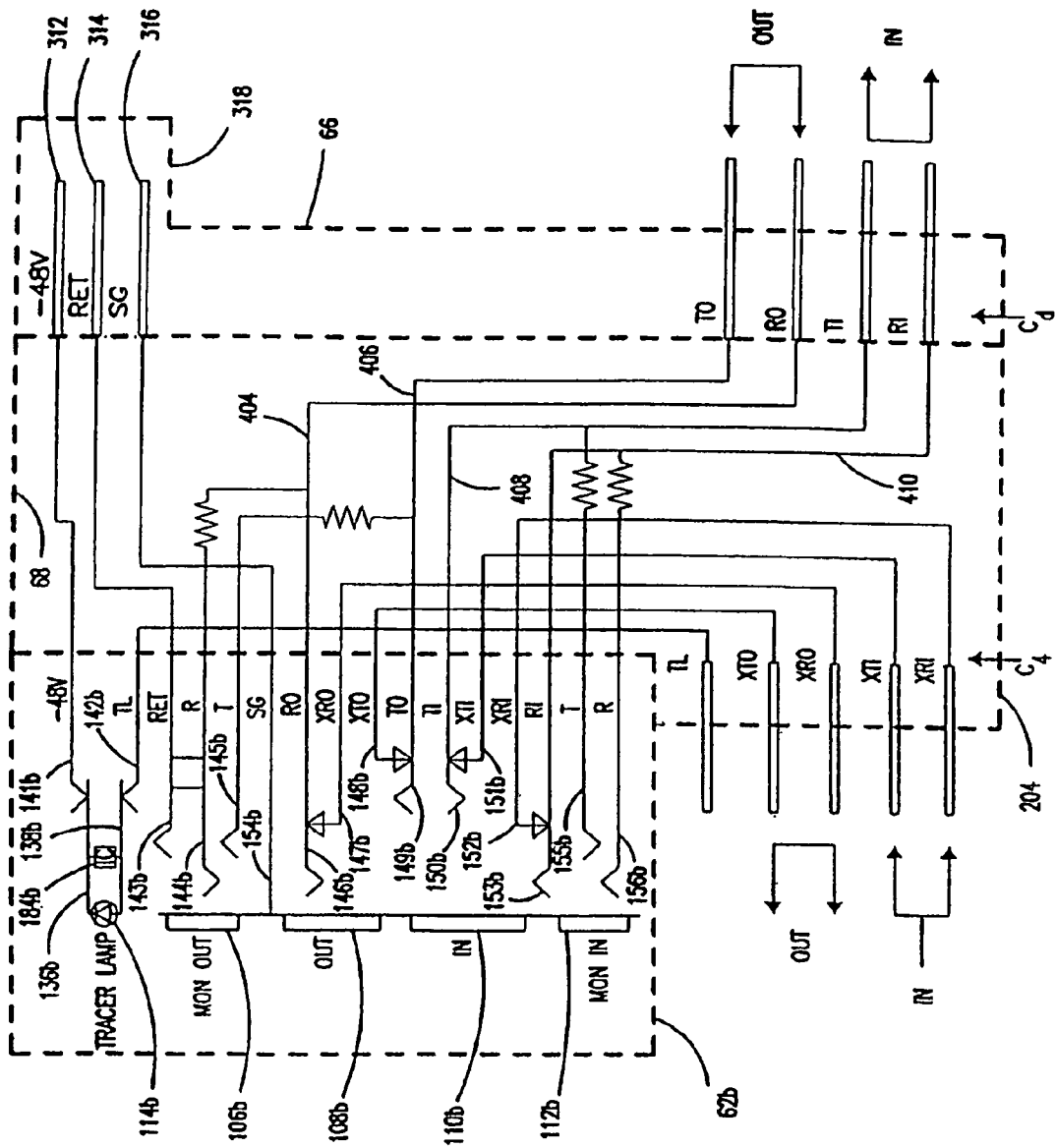
FIG. 18 is a schematic circuit diagram corresponding to the jack mount and twisted pair rear interface assembly of FIG. 15.

FIG. 18 is a circuit diagram illustrating the electrical connections made when one of the jacks 62b is inserted within jack mounting location $ML_4$. It will be appreciated that similar electrical configurations are used to interconnect jacks placed in mounting locations $ML_1$-$ML_3$ with the corresponding columns of contacts $C_1$-$C_3$ and $C_a$-$C_c$.

Referring to FIG. 18, the voltage spring 141b is electrically connected to an energized contact point (e.g., the voltage lead 312) for illuminating the LED. The tracer lamp spring 142b is connected to the tracer lamp contact TL of column $C_4$. The return spring 143b is connected to the return lead 314. The shield ground spring 154b is connected to the shield ground lead 316. The out ring spring 146b is connected to the ring-out contact RO by circuit path 404. The ring normal spring 147b is connected to the cross-connect ring-out contact XRO of column $C_4$. The tip normal spring 148b is connected to the cross-connect tip-out contact XTO of column $C_4$. Tip spring 149b is connected to the tip-out contact TO of column $C_d$ by circuit path 406. The monitor out ring spring 144b is connected to circuit path 404, and the monitor out tip spring 145b is connected to circuit path 406. Tip spring 150b is connected to the tip-in contact TI of column $C_d$ by circuit path 408. Tip normal spring 151b is connected to the cross-connect tip-in contact XTI of column $C_4$, and ring normal spring 152b is electrically connected to the cross-connect ring-in contact XRI of column $C_4$. Ring spring 153b is connected to the ring-in RI contact of column $C_d$ by circuit path 410. Tip spring 155b is connected to circuit path 408, while ring spring 156b is connected to circuit path 410.

Cross-connection of a signal from another jack arrives as an IN signal from cross-connect tip-in and ring-in contacts XTI and XRI of column $C_4$. With no plug inserted within the in port 110b, the IN signal is output at the tip-in and ring-in contacts TI and RI of column $C_d$.

By inserting a plug within the in port 110b, the IN signal from a cross-connected jack can be interrupted and a signal from the inserted plug can be outputted at points TI and RI. Similarly, by inserting a plug within the out port 108b, the OUT signal from contact points TO and RO is interrupted and may be outputted to the tip-and-ring contacts of the plug inserted within the out port 108b.

Frequently it is desirable to be able to monitor OUT signals arriving through contacts TO and RO without interrupting the OUT signals. To accomplish this, a plug is inserted into the monitor port 106b. On this occurrence, the plug is able to tap into the OUT signals being transmitted through circuit paths 404 and 406. Additionally, when the plug is inserted into the port 106b, the return spring 143b is biased upward into contact with the second lead 138b of the tracer lamp 114b. The electrical connection between the second lead 138b and the return spring 143b connects the LED circuit to the return line 314 thereby illuminating the LED. Integrated circuit chip 184b controls flashing of the LED 114b as is conventionally known in the art. In addition to activating the LED, insertion of a plug into the monitor port 106b also grounds the tracer lamp line TL causing illumination of a LED on a jack to which the present jack is cross-connected.

At times it is also desired to be able to monitor signals on the IN line without interrupting the IN line signal. To accomplish this, a plug is inserted into the monitor in port 112b. When the plug is inserted into the port 112b, the plug taps into the in signal being transmitted through circuit path 408 between contacts XTI and TI, and circuit path 410 between contacts XRI and RI.

VI. Coaxial Rear Interface Assembly

Figure 19:
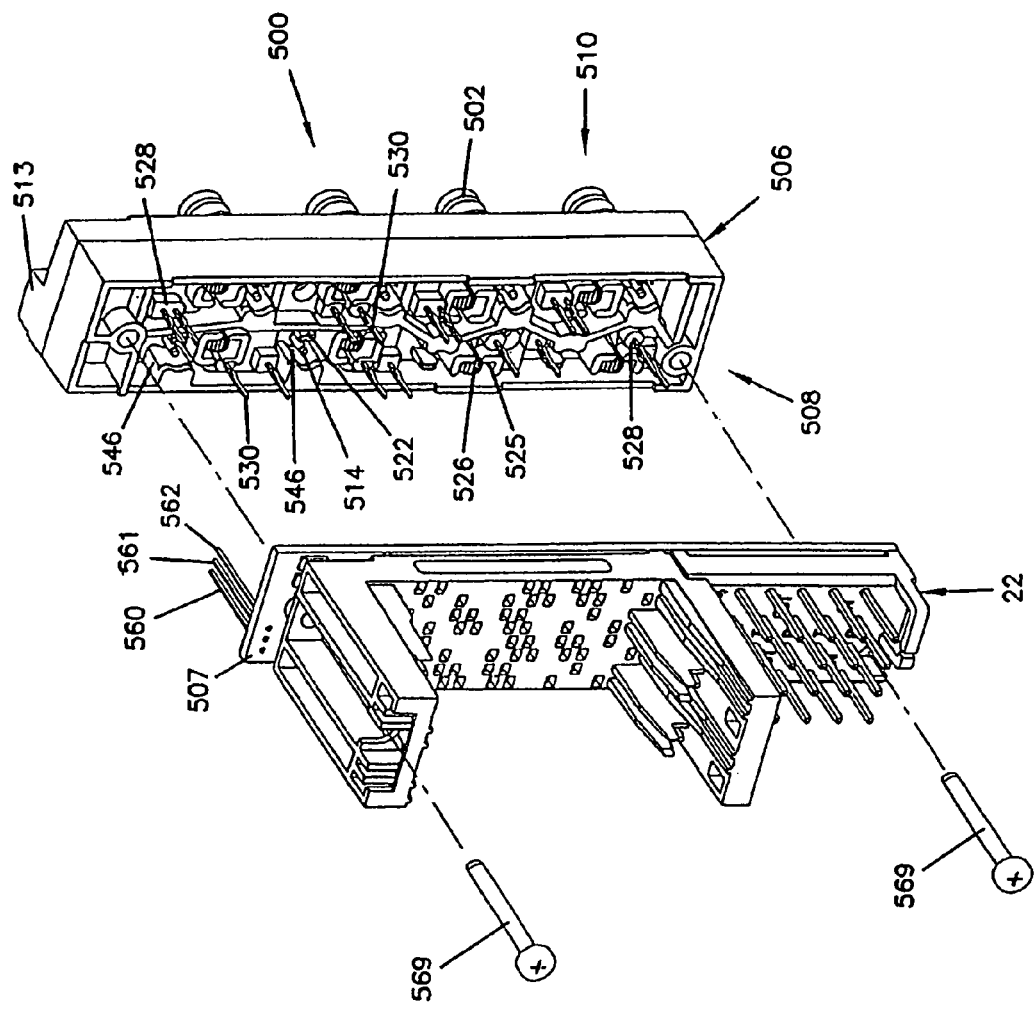
FIG. 19 is a front exploded view of a jack mount and coaxial rear interface assembly in accordance with the principles of the present invention.
Figure 20:
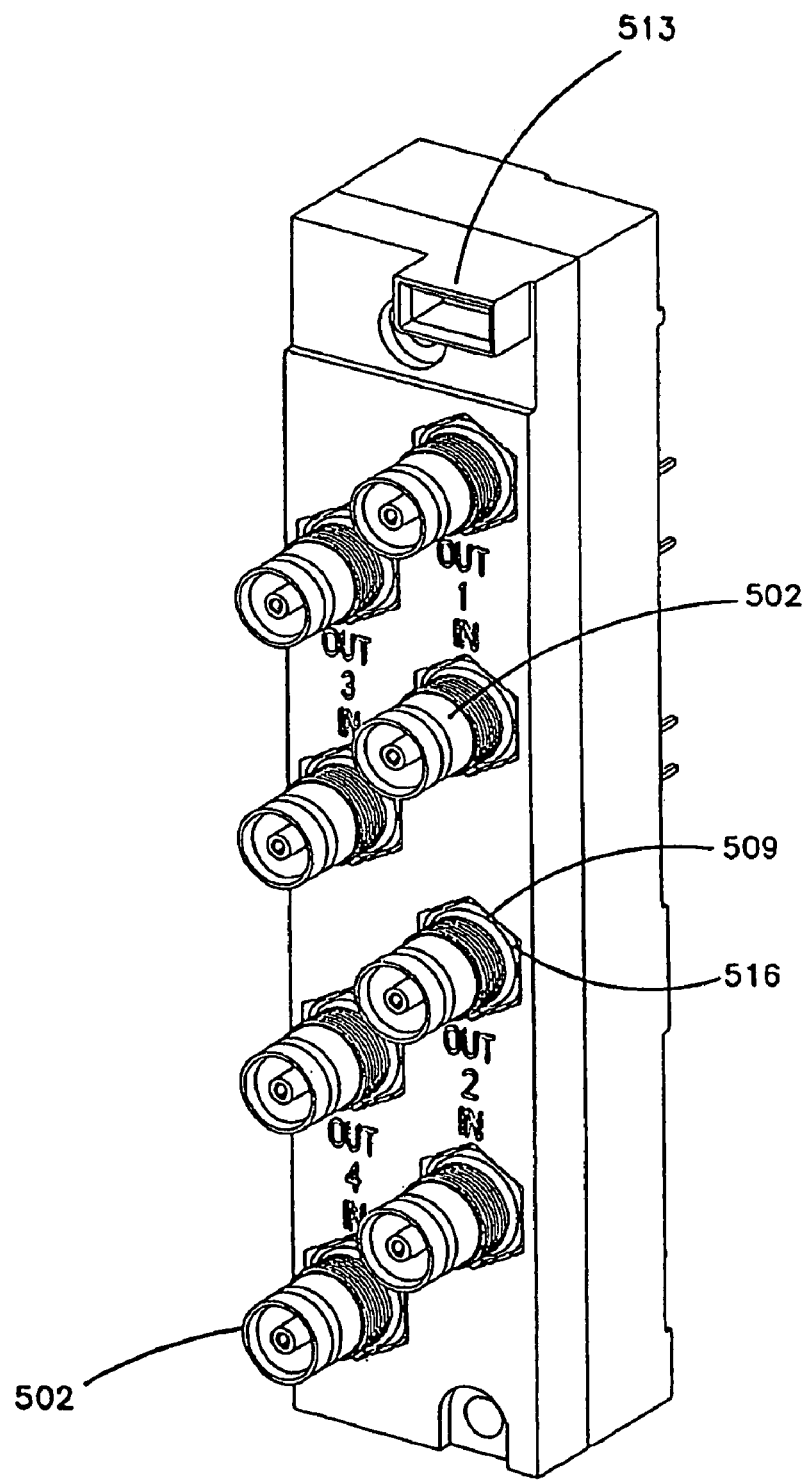
FIG. 20 is a rear perspective view of the coaxial rear interface assembly of FIG. 19.

FIG. 19 illustrates a rear interface assembly 500 adapted to be secured to the jack mount 22. As shown in FIG. 20, the rear interface assembly 500 includes eight coaxial connectors 502. Four of the connectors 502 are IN connectors and four are OUT connectors. It will be appreciated that the rear interface assembly 500 and the rear interface assembly 64 are both compatible with or mountable on a common jack. Hence, the same jack can be used to manufacture jack assemblies suited for either twisted pair or coaxial type signals. By using common parts, manufacturing efficiency is enhanced.

Figure 21:
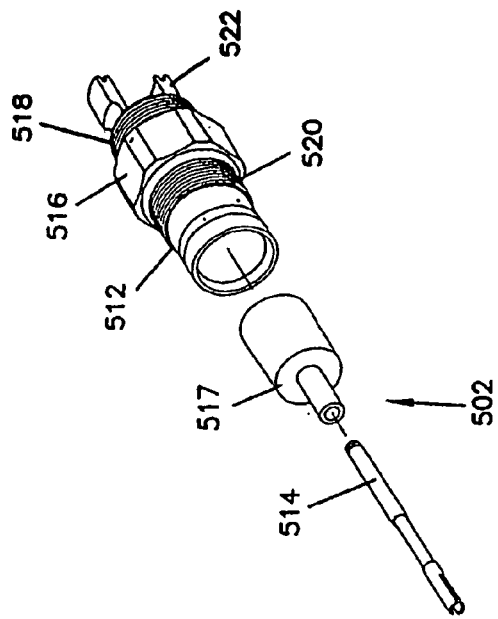
FIG. 21 is an exploded view of a connector constructed in accordance with the principles of the present invention.
Figure 22:
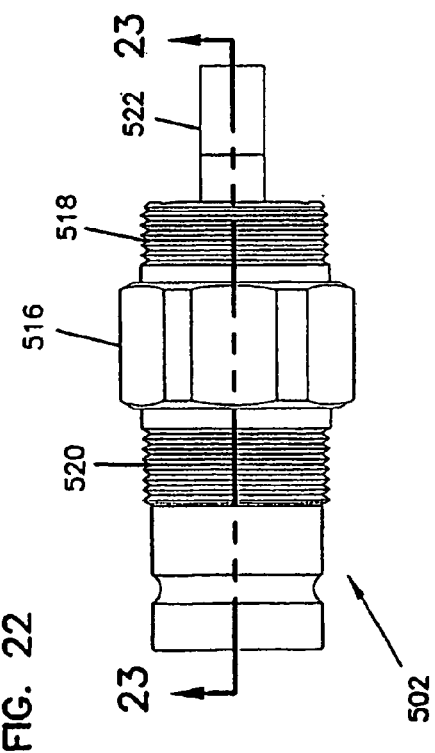
FIG. 22 is an assembled side view of the connector of FIG. 21.
Figure 23:
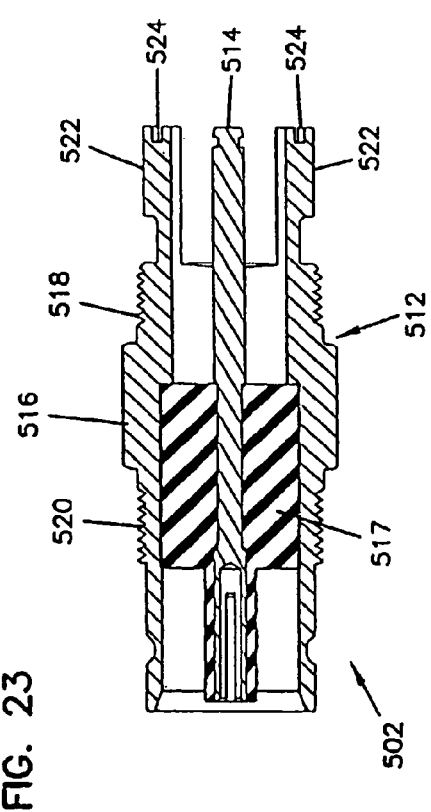
FIG. 23 is a cross-sectional view taken along section line 23-23 of FIG. 22.

FIGS. 21-23 illustrate one of the connectors 502. As shown in FIG. 23, the connector 502 is a type 1.6/5.6 connector and includes a grounded main body 512, a center conductor 514, and an insulator 517 mounted between the center conductor 514 and the main body 512. The main body includes a nut portion 516 having a generally hexagonal configuration. First and second threaded portions 518 and 520 are positioned on opposite sides of the nut portion 516. As best shown in FIG. 23, the main body also includes a pair of spaced-apart axial projections 522 that project axially from the main body 512. The first threaded portion 518 is positioned between the projections 522 and the nut portion 516, and the second threaded portion is adapted for connection to a coaxial connector. The axial projections 522 include notches 524 for facilitating terminating wires. The central conductor also projects outward the main body 512 at a location between the axial projections 522.

While a 1.6/5.6 type connector is shown, it will be appreciated that other types of coaxial connector could be used. For example, FIGS. 24-26 show a BNC style connector 502' suitable for use with the rear interface assembly. The connector 502' includes a grounded main body 512', a center conductor 514', and a three-legged insulator 517' mounted between the center conductor 514' and the main body 512'. The main body includes a nut portion 516' having a generally hexagonal configuration, and a pair of spaced-apart axial projections 522' that project axially from the main body 512'. A threaded portion 518' is positioned axially between the nut portion 516' and the projections 522'. The axial projections include notches 524' for facilitating terminating wires. The central conductor 514' projects outward from the main body 512' at a location between the axial projections 522'.

Referring again to FIG. 19, the rear interface assembly 500 includes a dielectric support 506 having a front side 508 that faces the jack mount 22 and a back side 510 that faces away from the jack mount 22. A circuit board 507 is positioned between the support 506 and the jack mount 22. The coaxial connectors 502 project outward from the back side 510 to provide access for connections. As shown in FIG. 20, the nut portions 516 of the connectors 502 are mounted within hexagon-shaped recesses 509 defined by the support 506. The nut portions 516 seat upon shoulders (not shown) within the recesses 509.

The circuit board 507, the jack mount 22 and the dielectric support 506 define coaxially aligned openings sized to receive fasteners 569 (e.g., bolts or screws) for connecting the pieces together. The fasteners 569 are preferably press fit through captivation washers (not shown) that hold the pieces 22, 507 and 506 together after assembly. The fasteners 569 are also used to connect the pieces 22, 507 and 506 to the chassis 20 (shown in FIG. 1).

A receptacle 513 for connection to one of the receptacles 54 of the power strip 52 also projects outward from the back side 510. The receptacle 513 is arranged to house a voltage lead 562, a return lead 561 and a sleeve ground lead 560. The leads 560-562 are electrically connected to the circuit board 507.

As shown in FIG. 19, the axial projections 522 and center conductors 514 extend through the dielectric support 506 and into chambers 546 formed in the front side 508 of the support 506. The front side 508 of the support 506 also defines a plurality of pockets 525 in which baluns 526 are retained or housed. One balun 526 corresponds to each connector 502. The front side 508 further includes a plurality of mounting bosses or pedestals 528 in which a plurality connection pins 530 are press fit or staked. The pins 530 project outward from the front side 508 and are arranged in a predetermined array that corresponds to an array of contacts (e.g., plated through-holes) of the circuit board 507. To accommodate the arrangement of the pins 530, the circuit board 507 typically has a different contact and circuit pathway configuration than the circuit board 68 of the twisted pair rear interface assembly 64.

Figure 27:
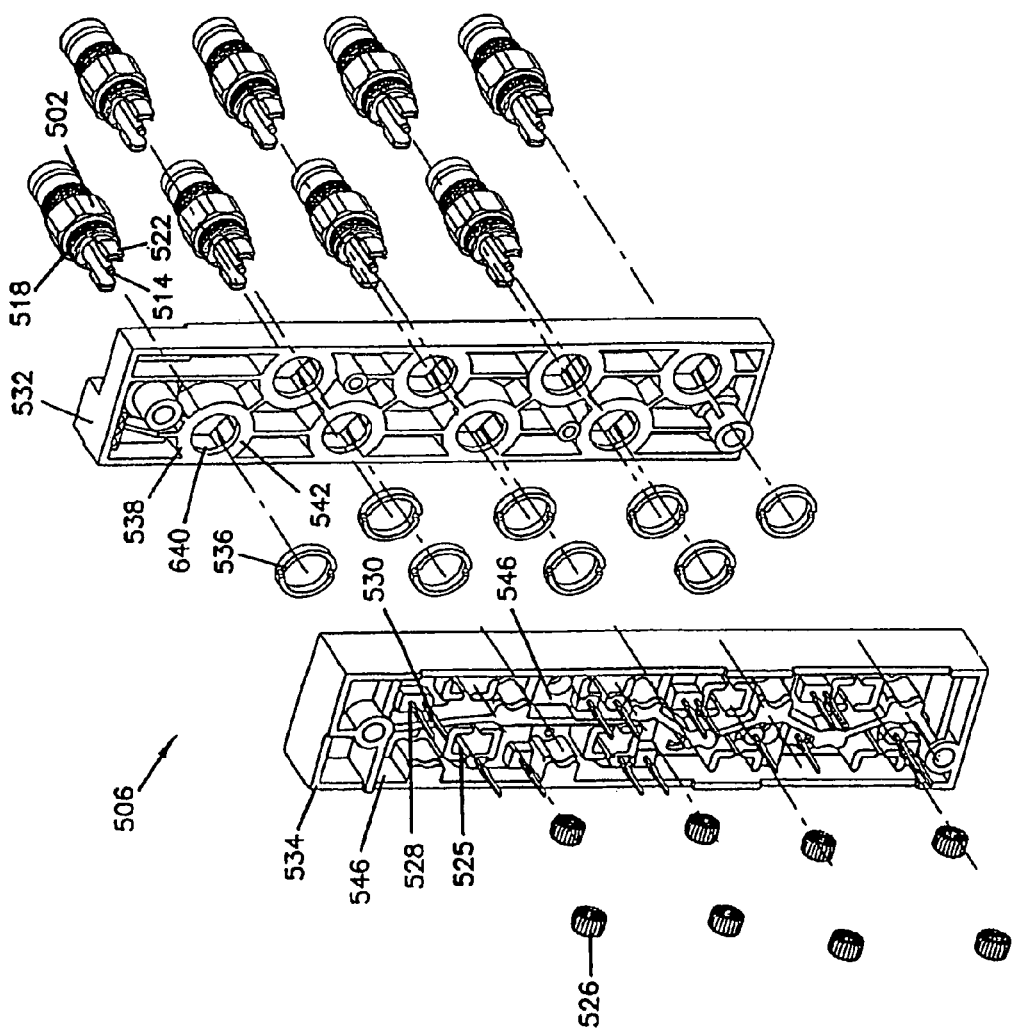
FIG. 27 is an exploded view of the coaxial rear interface assembly of FIG. 20.

Referring now to FIG. 27, the dielectric support 506 includes a connector support piece 532 that is detachably connected to a balun housing piece 534. The balun housing piece 534 includes the generally rectangular pockets 525 for retaining the baluns 526, and the pedestals 528 for mounting the pins 530. The connectors 502 are secured to the connector support piece 532 by internally threaded lock rings 536 that are threaded on the first threaded portions 518 of the connectors 502. To support the connectors 502, the support piece 532 includes integrally formed cylindrical sleeves 538 defining through-holes 540 for receiving the connectors 502. The cylindrical sleeves 538 also include rear seating surfaces 542 against which the lock rings 536 are tightened when the lock rings 536 are threaded on the first threaded portions 518 of the connectors. Interference between the lock rings 536 and the rear seating surfaces 542 prevent the connectors 502 from being pulled from the connector support piece 532. When the pieces 532 and 534 are connected, the rings 536 are concealed or housed within a chamber formed between the pieces 532 and 534.

The balun housing piece 534 defines the chambers 546 into which the extensions 522 and the central conductors 514 of the plugs 502 project when the assembly 500 is assembled. For example, at each chamber 546 the balun housing piece 534 defines two curved openings 550 (shown in FIGS. 28-30) for receiving the extensions 522 of the connectors 502, and a circular opening 552 between the curved openings 550 for receiving the central conductors 514 of the plugs 502. The housing piece 534 also defines a plurality of covers 554 for covering one of each pair of extension members 522.

Figure 30:
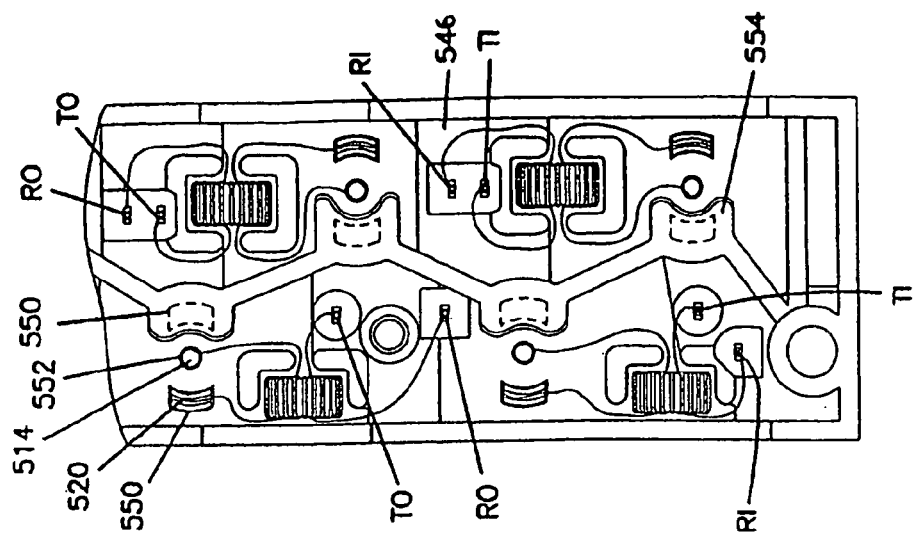
FIG. 30 is an enlarged view of another portion of FIG. 28.
Figure 29:
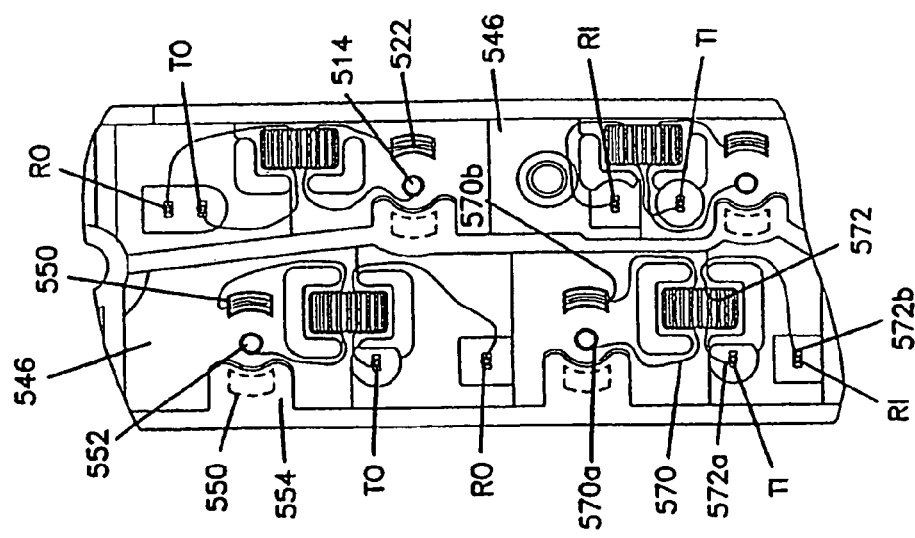
FIG. 29 is an enlarged view of a portion of FIG. 28.
Figure 28:
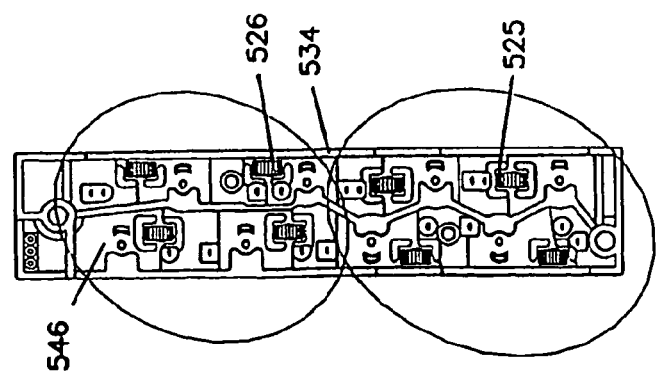
FIG. 28 is a rear view of the coaxial rear interface assembly of FIG. 20.

Referring still to FIGS. 28-30, the conductive pins 530 are divided into eight pairs of tip and ring contacts with each pair of tip and ring contacts corresponding to one of the connectors 502. The pairs of pins 530 corresponding to the OUT connectors 502 have been labeled TO (tip out) and RO (ring out), while the pairs of pins 530 corresponding to the IN connectors 502 have been labeled TI (tip in) and RI (ring in). When a coaxial signal arrives through one of the OUT connectors 502, the balun 526 corresponding to the connector converts the unbalanced coaxial signals to balanced twisted pair signals (i.e., tip and ring signals). The tip signal is forwarded from the balun 526 to its corresponding TO pin and the ring signal is forwarded to its corresponding RO pin. From the RO and TO pins, the signals are directed to a corresponding jack mounted within the jack mount 22 via circuit pathways on the circuit board 507. The baluns 526 corresponding to the IN connectors 502 are adapted to convert balanced twisted pair signals into unbalanced coaxial signals. For example, when tip and ring signals from a cross-connected jack arrive at one of the baluns 526, the balun converts the tip and ring signals into a coaxial signal that is outputted through the balun's corresponding IN connector. It will be appreciated that the electrical pathways that connect the TO, RO, TI and RI pins to corresponding jacks mounted within the jack mount 22 can be schematically depicted in that same manner as the TO, RO, TI and RI contacts of FIG. 18. It will also be appreciated that the baluns 526 function to match the impedance between the unbalanced coaxial signals and the balanced twisted pair signals.

Still referring to FIGS. 28-30, the baluns 526 preferably comprise torroid magnets each having two wound wires 570 and 572. The wires 570, 572 respectively terminate at ends 570a, 570b and 572a, 572b. To electrically connect one of the baluns 526, the ends 570a, 570b are respectively terminated at the central conductor 514 and one of the extensions 522 of the balun's corresponding connector 502, and the ends 572a, 572b are respectively terminated at the tip pin and the ring pin corresponding to the balun.

Having described preferred aspects and embodiments of the present invention, modifications and equivalents of the disclosed concepts may readily occur to one skilled in the art. However, it is intended that such modifications and equivalents be included within the scope of the claims which are appended hereto.

We claim:

1. A cross-connect assembly comprising:
    a plurality of jacks each including a separate jack body, each separate jack body being formed of a dielectric material, the dielectric material of each jack body defining a plurality of bores sized to receive standard tip-and-ring plugs having tip and ring contacts, each jack including a plurality of electrically conductive tip and ring springs, the tip springs being adapted to make electrical contact with the tip contacts of the plugs when the plugs are inserted within the bores, and the ring springs being adapted to make electrical contact with the ring contacts of the plugs when the plugs are inserted within the bores, each jack including a plurality of normal contacts adapted to normally make electrical contact with the tip and ring springs; and
    adjacent jack bodies having different port positioning such that the bores defined by the adjacent jack bodies are vertically staggered relative to one another.

2. The cross-connect assembly of claim 1, wherein each jack body includes an integrally formed spacers that separate the normal contacts.

3. The cross-connect assembly of claim 1, wherein the tip springs, the ring spring and the normal contacts extend through slots defined by the jack bodies.

4. The cross-connect assembly of claim 1, wherein each of the jacks includes a grounding strip that has electrical contacts corresponding to each of the bores, the electrical contacts being configured to engage a sleeve of a plug inserted within the bores, and wherein each of the jacks includes a ground spring electrically connected to the grounding strip.

5. The cross-connect assembly of claim 1, wherein the jacks include odd and even jacks, wherein the bores of each jack include a monitor bore, an in bore and an out bore, wherein the tip and ring springs are in general alignment with the in bore, the out bore and the monitor bore, and wherein the normal contacts are adapted to normally make electrical contact with the tip and ring springs in general alignment with the in and out bores.

6. The cross-connect assembly of claim 5, wherein the bores of the odd jacks are arranged in a different pattern than the bores of the even jacks.

7. The cross-connect assembly of claim 5, wherein each jack body includes an integrally formed spacer that separates the normal contacts that are adapted to normally make electrical contact with the tip and ring springs in general alignment with in bore and an integrally formed spacer that separates the normal contacts that are adapted to normally make electrical contact with the tip and ring springs in general alignment with the out bore.

8. The cross-connect assembly of claim 5, wherein each jack body includes an integrally formed spacer that separates the tip and ring springs in general alignment with the monitor bore.

9. The cross-connect assembly of claim 5, wherein the tip springs, the ring spring and the normal contacts extend through slots defined by the jack bodies.

10. The cross-connect assembly of claim 5, wherein the odd jacks have different spacings between the bores than the even jacks.

11. The cross-connect assembly of claim 5, wherein each of the jacks includes a grounding strip that has electrical contacts corresponding to each of the bores, the electrical contacts being configured to engage a sleeve of a plug inserted within the bores, and wherein each of the jacks includes a ground spring electrically connected to the grounding strip.

12. The cross-connect assembly of claim 5 wherein each jack body defines a monitor chamber in which the tip and ring springs in general alignment with the monitor port are located, wherein each jack body defines an in chamber in which the tip and ring springs in general alignment with the in port and their corresponding normal contacts are located, and wherein each jack body defines an out chamber in which the tip and ring springs in general alignment with the out port and their corresponding normal contacts are located.

13. The cross-connector assembly of claims 12, wherein the monitor bore includes an out monitor bore.

14. The cross-connector assembly of claims 12, wherein the monitor bore includes an in monitor bore.

15. The cross-connect assembly of claims 12, wherein each jack body defines an in monitor bore and an out monitor bore, and wherein pairs of the tip and ring springs are in general alignment with the in monitor bore and with the out monitor bore.

16. The cross-connect assembly of claims 15, wherein each jack includes an LED.

17. The cross-connect assembly of claims 16, wherein each jack includes a resilient retaining member.

18. The cross-connect assembly of claim 17, wherein the resilient retaining member includes a cantilevered locking member.

19. The cross-connect assembly of claim 17, wherein the resilient retaining members are provided at bottom sides of the odd jacks and at top sides of the even jacks.

20. The cross-connect assembly of claim 18, wherein each jack body includes a transverse wall that forms a base end of the cantilevered locking member, wherein each jack body includes a guide member that extends from a back side of the jack body to the transverse wall, wherein the guide member tapers laterally outward as it extends from the back side toward the transverse wall, and wherein each jack body includes alignment members that project outward from opposite sides of the guide member, that are connected to the transverse wall, and that at least partially define alignment notches.

21. The cross-connect assembly of claim 18, wherein each jack body includes a guide member that extends between a front side and a back side of the jack body, the guide member tapering laterally outward as it extends from the back side toward the front side of the jack body, wherein each jack body also includes guide surfaces positioned at opposite sides of the guide member, the guide surfaces including substantially parallel front and rear portions interconnected by a ramp portion.

* * * * *